(12) United States Patent
Hiroe et al.

(10) Patent No.: US 11,024,286 B2
(45) Date of Patent: Jun. 1, 2021

(54) SPOKEN DIALOG SYSTEM, SPOKEN DIALOG DEVICE, USER TERMINAL, AND SPOKEN DIALOG METHOD, RETRIEVING PAST DIALOG FOR NEW PARTICIPANT

(71) Applicant: NATIONAL INSTITUTE OF INFORMATION AND COMMUNICATIONS TECHNOLOGY, Tokyo (JP)

(72) Inventors: Atsuo Hiroe, Tokyo (JP); Takuma Okamoto, Tokyo (JP); Yutaka Kidawara, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 117 days.

(21) Appl. No.: 16/348,471

(22) PCT Filed: Nov. 6, 2017

(86) PCT No.: PCT/JP2017/039915
§ 371 (c)(1),
(2) Date: May 8, 2019

(87) PCT Pub. No.: WO2018/088355
PCT Pub. Date: May 17, 2018

(65) Prior Publication Data
US 2020/0066254 A1 Feb. 27, 2020

(30) Foreign Application Priority Data
Nov. 8, 2016 (JP) .............................. JP2016-218128

(51) Int. Cl.
*G06F 40/58* (2020.01)
*G10L 13/08* (2013.01)
(Continued)

(52) U.S. Cl.
CPC ............ *G10L 13/086* (2013.01); *G06F 40/51* (2020.01); *G10L 13/00* (2013.01); *G10L 15/005* (2013.01)

(58) Field of Classification Search
CPC combination set(s) only.
See application file for complete search history.

(56) References Cited

U.S. PATENT DOCUMENTS

2005/0171944 A1\* 8/2005 Palmquist ............... G06F 40/58
2013/0238312 A1\* 9/2013 Waibel .................. G06F 3/0486
704/8
(Continued)

FOREIGN PATENT DOCUMENTS

JP  2005-250379 A   9/2005
JP  2014-063342 A   4/2014
(Continued)

OTHER PUBLICATIONS

Okamoto Takuma, et al. "Cross-lingual voiceconversation based on language understanding WFST parallel connection," a collection of papers from 2015 Autumn Meeting of the Acoustical Society of Japan, pp. 35-38, Sep. 2, 2015; with English translation.
(Continued)

*Primary Examiner* — Jialong He
(74) *Attorney, Agent, or Firm* — McDermott Will & Emery LLP

(57) ABSTRACT

In order to solve a conventional problem that, after a series of dialog between a user and a spoken dialog device has progressed to some extent, that user or another user cannot see or recognize a previous dialog status, a cross-lingual spoken dialog system is provided wherein, in a case in which an instruction from a user terminal is received by a pairing server, dialog information stored in a storage medium is transmitted to the user terminal. Accordingly, even after a series of dialog between a user and the spoken dialog device
(Continued)

has progressed to some extent, that user or another user can see or recognize a previous dialog status.

5 Claims, 27 Drawing Sheets

(51) Int. Cl.
*G06F 40/51* (2020.01)
*G10L 15/00* (2013.01)
*G10L 13/00* (2006.01)

(56) References Cited

U.S. PATENT DOCUMENTS

| | | |
|---|---|---|
| 2014/0303982 A1 | 10/2014 | Yun |
| 2014/0337007 A1* | 11/2014 | Waibel .................... G10L 13/02 704/3 |
| 2018/0314689 A1* | 11/2018 | Wang ...................... G10L 15/22 |

FOREIGN PATENT DOCUMENTS

| | | |
|---|---|---|
| JP | 2014-204429 A | 10/2014 |
| WO | 2014/045679 A1 | 3/2014 |

OTHER PUBLICATIONS

"Introduction of Cross-lingual Speech Daialogue System", [online], [Search on Oct. 30, 2016], Internet [URL: https://www.nict.go.jp/video/cross-lingual.html]; with screen shot of the first screen and English translation of outline thereof, English translation of script online.

International Search Report issued in International Patent Application No. PCT/JP2017/039915, dated Jan. 16, 2018; with English translation.

Written Opinion of the Search Agency issued in International Patent Application No. PCT/JP2017/039915, dated Jan. 16, 2018; with partial English translation.

* cited by examiner

"Taken out" virtual agent 1301

| Speaker | Speech language | Texts in all languages | Scenario state | |
|---|---|---|---|---|
| User | Japanese | 日本語：奈良駅への行き方を教えて<br>英語：Please tell me how to get to Nara Station.<br>中国語：・・・・・<br>韓国語：・・・・・ | State 1 → State 2 | ⎫<br>⎬ 1701<br>⎪ |
| System | Japanese | 日本語：奈良駅にはバスと電車で行けます。・・・<br>英語：You can get to Nara Station by bus and train.・・・<br>中国語：・・・・・<br>韓国語：・・・・・ | | ⎪ |
| User | English | 日本語：京都駅への行き方を教えて<br>英語：Please tell me how to get to Kyoto Station.<br>中国語：・・・・・<br>韓国語：・・・・・ | State 2 → State 3 | ⎭ |
| System | English | 日本語：京都駅にはバスと電車で行けます。・・・<br>英語：You can get to Kyoto Station by bus and train.・・・<br>中国語：・・・・・<br>韓国語：・・・・・ | | |
| User | Japanese | 日本語：何分かかりますか？<br>英語：How long does it take?<br>中国語：・・・・・<br>韓国語：・・・・・ | State 3 → State 3 | ⎫<br>⎬ 1702 |
| System | Japanese | 日本語：約60分です。<br>英語：About sixty minutes.<br>中国語：・・・・・<br>韓国語：・・・・・ | | ⎪ |
| User | Chinese | 日本語：いくらですか？<br>英語：How much is it?<br>中国語：多少銭？<br>韓国語：・・・・・ | State 3 → State 3 | ⎭ |

FIG.17

| Speaker | Speech language | Texts in all languages | Scenario state | |
|---|---|---|---|---|
| User | Japanese | 日本語：奈良駅への行き方を教えて<br>英語：Please tell me how to get to Nara Station.<br>中国語：・・・・・<br>韓国語：・・・・・ | State 1 → State 2 | 2201 |
| System | Japanese | 日本語：奈良駅にはバスと電車で行けます。・・・<br>英語：You can get to Nara Station by bus and train.・・・<br>中国語：・・・・・<br>韓国語：・・・・・ | | |
| User | Japanese | 日本語：いくらですか？<br>英語：How much is it?<br>中国語：多少錢？<br>韓国語：・・・・・ | State 2 → State 2 | 2202 |
| System | English | 日本語：580円です。<br>英語：It's 580 yen.<br>中国語：580日元<br>韓国語：・・・・・ | | |

FIG.22

SPOKEN DIALOG SYSTEM, SPOKEN DIALOG DEVICE, USER TERMINAL, AND SPOKEN DIALOG METHOD, RETRIEVING PAST DIALOG FOR NEW PARTICIPANT

CROSS-REFERENCE OF RELATED APPLICATIONS

This application is the U.S. National Phase under 35 U.S.C. § 371 of International Patent Application No. PCT/JP2017/039915, filed on Nov. 6, 2017, which in turn claims the benefit of Japanese Application No. 2016-218128, filed on Nov. 8, 2016, the entire disclosures of which Applications are incorporated by reference herein.

TECHNICAL FIELD

The present invention relates to, for example, a cross-lingual spoken dialog device that is used in an environment in which multiple languages are used in a mixed manner.

BACKGROUND ART

When a user inputs a voice speech regarding a question or the like to a spoken dialog system, the system performs processes (1) to (4) below on the input speech, and outputs the obtained response in voice, text, or the like.
(1) Speech recognition: convert an input speech to a corresponding text.
(2) Language understanding: classify speech recognition results into concepts according to meanings, and extract keywords that are used to generate a response, for example.
(3) Dialog control: generate a text of a proper response from the concepts and the keywords. Processing such as generating different responses to the same input speech by reflecting a dialog history or transitioning a dialog scenario is performed as necessary.
(4) Speech synthesizing: convert a response text to a corresponding speech waveform.

Furthermore, in areas such as airports and famous sightseeing areas in which people who speak various languages gather, it is desirable that spoken dialog systems that provide facility information or sightseeing information are available in multiple languages. Systems that are available in only a single language are referred to as mono-lingual (language) dialog systems, and systems that are available in multiple languages are referred to as multi-lingual (language) dialog systems. In order to switch the languages, it is technically possible to automatically determine a language of a user input speech and apply speech recognition/language understanding/response generation/speech synthesizing corresponding to that language, as well as to urge a user to manually switch the languages.

Moreover, in environments in which there are people who speak various languages as described above, there may be cases in which multiple people who speak different languages simultaneously use one system. In such cases, when a user proceeds a dialog with a system in one language and then a user who speaks a different language starts a dialog with the system, generating a response while taking over a dialog history up to that time is advantageous in the following aspects.
(1) When a user wants to add a question to a question that was asked by a previous user, it is not necessary to input the previous question again even in the case in which the languages are switched, and thus a larger number of users can use the system in the same time compared with the cases in which dialogs are not taken over between languages.
(2) Users who speak different languages can use one system together, and thus the system can be a communication facilitating tool.

Spoken dialog systems with these characteristics are referred to as cross-lingual spoken dialog systems.

Non-Patent Documents 1 and 2 below disclose conventional techniques of cross-lingual dialog systems. These cross-lingual dialog systems are spoken dialog systems that employ the framework of a weighted finite-state transducer (WFST).

The above-described spoken dialog systems have a mechanism that displays speeches input by users and responses from a system in all available languages. This display is referred to as "live broadcast display". FIG. 27 shows an example of live broadcast display. In FIG. 27, one robot (R) serving as a spoken dialog system and three users (EU, JU, CU) who speak English, Japanese, and Chinese are having a dialog. In this case, the user (EU) who speaks English inputs a speech in English to the robot (R), and the robot (R) provides a response to the user in English. Also, the user (JU) who speaks Japanese and the user (CU) who speaks Chinese input speeches in their languages, and the robot (R) provides responses to the users in the same languages. Meanwhile, in the display of live broadcast display, a speech input by a user is displayed not only in a language of the user who input the speech but also in other available languages. Furthermore, in a similar manner, a response from the robot (R) is displayed not only in a language of the user who input the speech but also in other available languages.

With such live broadcast display, users who speak different languages and are joining a cross-lingual dialog easily understand speeches input by other users and responses from the system. Furthermore, people (hereinafter, referred to as "onlookers" as appropriate) who are looking at the dialog around the dialog system also understand the content of the dialog, and thus they are readily to join the dialog from any point during the dialog.

CITATION LIST

Non-Patent Document

Non-patent Document 1: OKAMOTO Takuma, HIROE Atsuo, HORI Chiori, KAWAI Hisashi, "Gengo rikai WFST heiretsu setsuzoku ni motozuku kurosuringaru onsei taiwa", a collection of papers from 2015 Autumn Meeting of the Acoustical Society of Japan, pp. 35-38, September, 2015.

Non-Patent Document 2: "Kurosuringaru onsei taiwa shisutemu no syoukai", online, accessed on Oct. 30, 2016, Internet address URL: https://www.nict.go.jp/video/cross-lingual.html

SUMMARY OF INVENTION

Technical Problem

However, conventional spoken dialog systems are problematic in that, after a series of dialog between a user and a spoken dialog system has progressed to some extent, that user or another user cannot see or recognize a previous dialog status.

More specifically, the above-described live broadcast display has problems, for example, as (A) to (C) below.

(A) If a dialog system does not include a display screen, this technique cannot be applied.
(B) Since one display screen displays information to all users in all languages, not very much information cannot be displayed. That is to say, those that can be displayed is only the latest turn or merely several previous turns of speeches input by users and responses from the system. Accordingly, in order to understand a dialog, an onlooker has to continuously view the live broadcast display from the start of the dialog (the start of the dialog session).
(C) Although an onlooker can join a dialog from any point during the dialog, the onlooker hesitates to join the dialog from a point during the dialog if he or she does not want to disturb the dialog of an existing user or does not want others to listen to the input speech.

In view of these problems, it is an object of at least part of the present invention to allow, in a cross-lingual spoken dialog system or the like, even after a series of dialog between a user and the spoken dialog system has progressed to some extent, that user or another user to see or recognize a previous dialog status.

Furthermore, it is another object of at least part of the present invention to allow a user to continue a dialog independently of a first user, from any point during the series of dialog.

Solution to Problem

A first aspect of the present invention is directed to a spoken dialog system, wherein dialog information, which is information of a series of dialog, is stored in a storage medium, the dialog information having an input speech text that is a speech recognition result of an input speech input by a user, one or more input speech translation results that are generated from the input speech text, a response text that is a response from the system to the input speech text, and a response translation result that is generated from the response text, and during a progress of a dialog in the cross-lingual spoken dialog system, in a case in which a pairing instruction is received from a user terminal, pairing processing with the user terminal is performed, and the dialog information is transmitted to the user terminal.

With this configuration, in the cross-lingual spoken dialog system, even after a series of dialog between a user and the spoken dialog system has progressed to some extent, that user or another user can see or recognize a previous dialog status.

Furthermore, a second aspect of the present invention is directed to a spoken dialog device including: a dialog information storage unit in which dialog information, which is information of a series of dialog, is stored, the dialog information having an input speech text that is a speech recognition result of an input speech input by a user, and a response text that is a response from a system to the input speech text; an accepting unit that accepts an input speech that can be input in two or more different languages; a speech recognition unit that performs speech recognition on the input speech, thereby generating an input speech text that is a speech recognition result; a dialog control unit that generates a response text that is a response to the input speech text, using the input speech text; a translation unit that generates one or more input speech translation results from the input speech text, and generates one or more response translation results from the response text; a speech synthesizing unit that acquires an audio speech according to the response text; a speech output unit that outputs the audio speech; an instruction receiving unit that receives a pairing instruction from a user terminal; and a dialog information transmitting unit that, in a case in which the instruction receiving unit receives the instruction from the user terminal, transmits the dialog information stored in the dialog information storage unit, to the user terminal.

With this configuration, even after a series of dialog between a user and the spoken dialog device has progressed to some extent, that user or another user can see or recognize a previous dialog status.

Furthermore, a third aspect of the present invention is directed to the spoken dialog device according to the second aspect, wherein the accepting unit accepts an input speech from a user terminal as well, and in a case in which an input speech from a user terminal is accepted, the dialog control unit generates a response text that is a response to an input speech text corresponding to the input speech, from the input speech text, and the response text is transmitted to the user terminal.

With this configuration, if a user inputs a speech to the user terminal, synchronization is canceled, and branching of a dialog history can be caused to occur. That is to say, for example, second and subsequent users can continue a dialog independently of a first user from any point during the dialog, by inputting a speech to their own user terminals.

Furthermore, a fourth aspect of the present invention is directed to the spoken dialog device according to the third aspect, wherein the dialog control unit also accepts point information indicating one point in dialog information of a series of dialog, and generates a response text that is a response to an input speech text corresponding to an input speech from the user terminal, from the input speech text, using information of a dialog in the dialog information, the information being information of a dialog up to a point corresponding to the point information.

With this configuration, branching of a dialog can be performed back to previous communication in the dialog.

Furthermore, a fifth aspect of the present invention is directed to a user terminal including: a terminal transmitting unit that transmits a pairing instruction at a point during a series of dialog with the spoken dialog system according to claim 1 or the spoken dialog device according to any one of claims 2 to 4; a terminal receiving unit that receives dialog information, which is information of a series of dialog up to that time, in response to transmission of the instruction; a terminal storage unit in which a language identifier for identifying a language that is used by a user is stored; and a terminal output unit that outputs only information in a language that is identified with the language identifier, in the dialog information received by the terminal receiving unit.

With this configuration, even after a series of dialog between a user and the spoken dialog device has progressed to some extent, another user can see or recognize a previous dialog status in a language that is used by that user.

Advantageous Effects of Invention

According to the spoken dialog system and the like of the present invention, even after a series of dialog with a user has progressed to some extent, that user or another user can see or recognize a previous dialog status.

BRIEF DESCRIPTION OF DRAWINGS

FIG. 17 is a diagram showing dialog information, which is a dialog history, in the embodiment.

FIG. 22 is a diagram showing dialog information, which is a dialog history, in the embodiment.

DESCRIPTION OF EMBODIMENT

Figure 1:
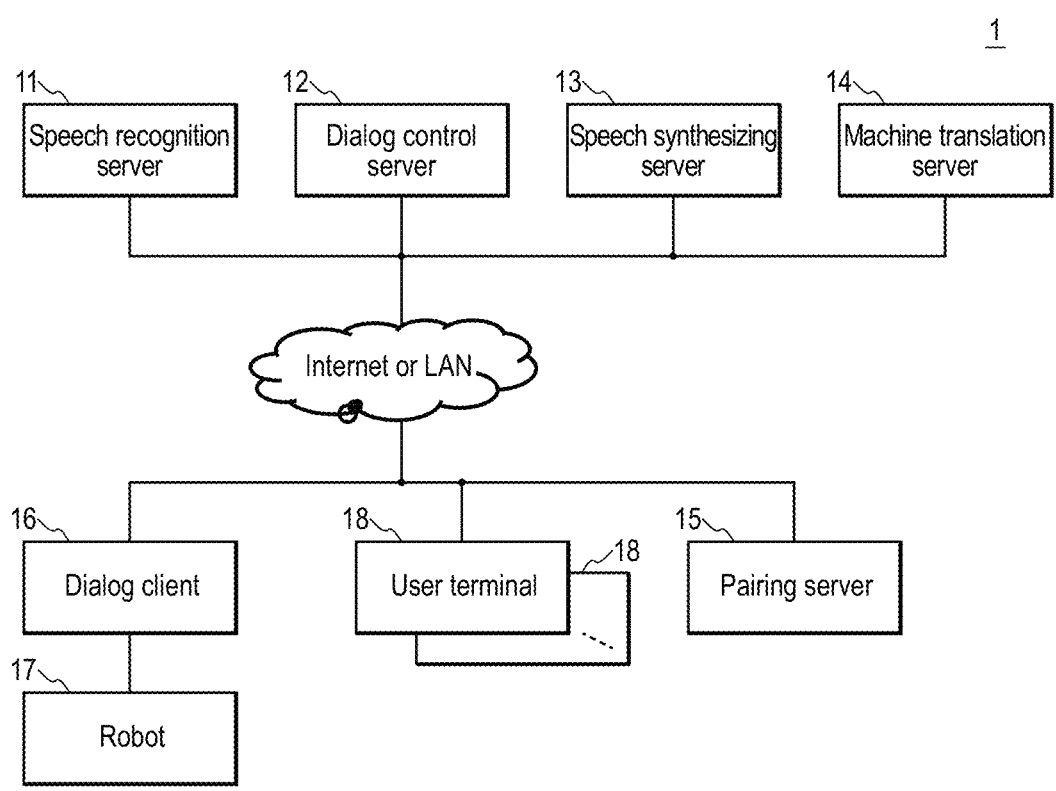
FIG. 1 is a diagram showing an example of a system configuration diagram of a spoken dialog system 1 in Embodiment 1.

Hereinafter, embodiments of a spoken dialog system and the like will be described with reference to the drawings. It should be noted that constituent elements denoted by the same reference numerals in the embodiments perform similar operations, and thus a description thereof may not be repeated.

Embodiment 1

In this embodiment, a spoken dialog system will be described in which dialog information, which is information of a series of dialog, is stored in a storage medium during the progress of a dialog in the cross-lingual spoken dialog system, the dialog information having an input speech text that is a speech recognition result of an input speech input by a user, and a response text that is a response from the system to the input speech text, and, during the progress of the dialog, in a case in which a pairing instruction is received from a user terminal, pairing processing with the user terminal is performed, and the dialog information is transmitted to the user terminal.

Furthermore, in this embodiment, a spoken dialog system in which the spoken dialog system and a user terminal can be synchronized with each other will be described.

Furthermore, in this embodiment, a spoken dialog system in which, if a user inputs a speech to a user terminal, synchronization with the spoken dialog system is canceled, and branching of a dialog history can be caused to occur will be described.

Furthermore, in this embodiment, a spoken dialog system in which branching can be caused to occur back to previous communication through an operation on a user terminal will be described.

FIG. 1 shows an example of a system configuration diagram of a spoken dialog system 1 in this embodiment. The spoken dialog system 1 includes a speech recognition server 11, a dialog control server 12, a speech synthesizing server 13, a machine translation server 14, a pairing server 15, a dialog client 16, a robot 17, and one or at least two user terminals 18. The spoken dialog system 1 may be considered not to include the user terminals 18.

It is assumed that the speech recognition server 11, the dialog control server 12, the speech synthesizing server 13, the machine translation server 14, the pairing server 15, the dialog client 16, and the user terminals 18 can communicate with each other via a network such as the Internet or a LAN.

It is assumed that the spoken dialog system 1 includes the robot 17 as an actual dialog agent, and can control the robot 17 from the dialog client 16.

Furthermore, the speech recognition server 11, the dialog control server 12, the speech synthesizing server 13, the machine translation server 14, the pairing server 15, and the dialog client 16 are typically so-called server apparatuses such as cloud servers or ASP servers, and there is no limitation on the type. These servers may be realized by so-called personal computers or the like. The robot 17 is a robot that a user who has a dialog speaks to. The robot may be a robot in the shape of a human, or an animal or the like. That is to say, there is no limitation on the shape of the robot. The robot 17 passes an accepted user's speech to the dialog client 16, and outputs the accepted speech from the dialog client 16. It will be appreciated that the dialog client 16 and the robot 17 may be integrated. Furthermore, the user terminals 18 are, for example, so-called smartphones, tablet devices, personal computers, mobile phones, or the like, and there is no limitation on the type. Note that the robot 17 is referred to as a dialog robot 17 as appropriate.

Figure 2:
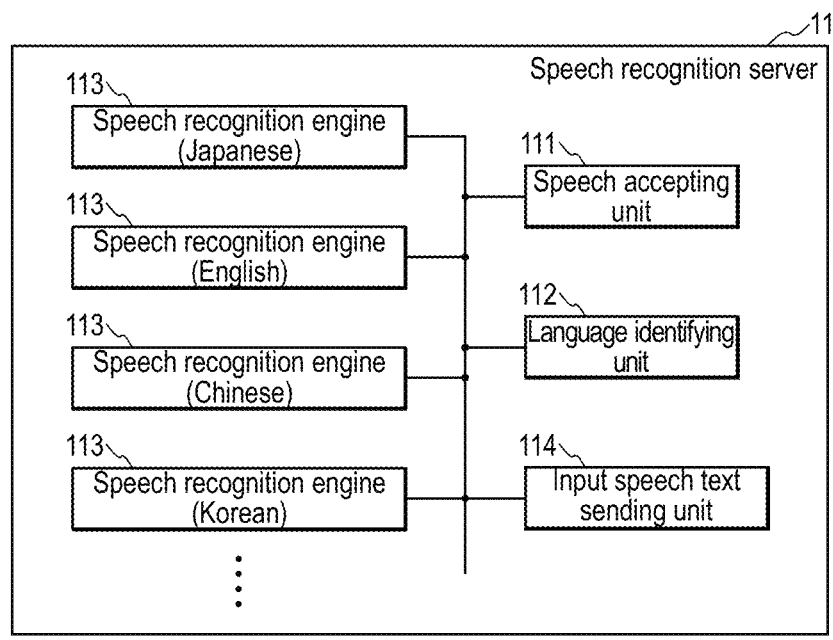
FIG. 2 is a block diagram of a speech recognition server 11 constituting the spoken dialog system 1 in the embodiment.

FIG. 2 is a block diagram of the speech recognition server 11 constituting the spoken dialog system 1 in this embodiment. The speech recognition server 11 includes a speech accepting unit 111, a language identifying unit 112, speech recognition engines 113, and an input speech text sending unit 114. In this example, speech recognition engines 113 are provided for respective languages corresponding to two or more languages such as Japanese and English, but it will be appreciated that one speech recognition engines 113 may perform speech recognition processing on speeches in multiple languages.

The speech recognition server 11 accepts an input speech that can be input in two or more different languages, and performs speech recognition on the input speech, thereby generating an input speech text that is a speech recognition result. More specifically, the speech recognition server 11 specifies a language corresponding to an accepted speech waveform, generates a recognition result, and transmits a set of a language identifier, which is a language identifying result, and a recognition result to a client. Note that the client herein is an apparatus that requests a service (speech recognition processing, in this case). The client in this example is, for example, the dialog client 16, but may also be the user terminals 18 or the like, and there is no limitation on the client.

Furthermore, the speech recognition server 11 accepts an input speech from the user terminals 18 as well. The accepting in this example is typically receiving. However, the accepting may be accepting an input speech from an unshown microphone. The input speech is data of a speech input by a user to the robot 17 or the user terminals 18. Note that various algorithms are conceivable for speech recognition processing that is performed by the speech recognition server 11, and the speech recognition processing is a known technique, and thus a detailed description thereof has been omitted.

Hereinafter, the speech recognition server 11 will be described in detail. The speech accepting unit 111 constituting the speech recognition server 11 accepts an input speech.

The language identifying unit 112 performs processing that identifies a language from the input speech accepted by the speech accepting unit 111, and acquires a language identifier. The language identifier may be any information for identifying a language, and there is no limitation on the data structure. The language identifier is, for example, "Japanese", "English", "Chinese", or "Korean", or "J", "E", "C", or "K", or the like. Note that the processing by the language identifying unit 112 is a known technique, and thus a detailed description thereof has been omitted.

The speech recognitions engines 113 perform speech recognition on the input speech accepted by the speech accepting unit 111, thereby acquiring an input speech text that is a speech recognition result.

The input speech text sending unit 114 sends the input speech text acquired by the speech recognition engines 113. The input speech text sending unit 114 typically transmits the input speech text to a client. Note that the client in this example is, for example, the speech recognition server 11, the dialog control server 12, the dialog client 16, or the user terminals 18, but may also be other apparatuses.

Figure 3:
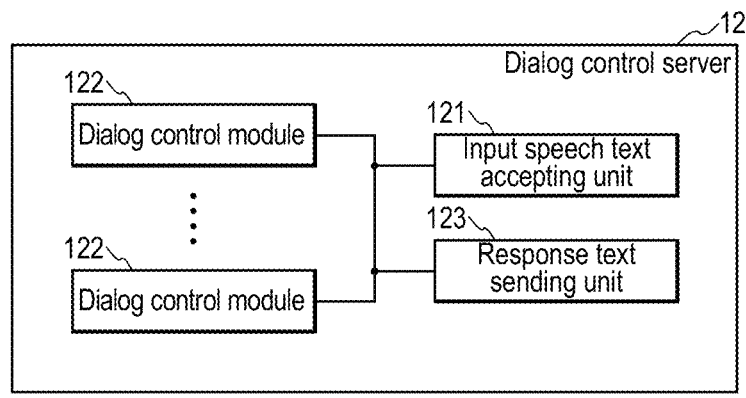
FIG. 3 is a block diagram of a dialog control server 12 in the embodiment.

FIG. 3 is a block diagram of the dialog control server 12. The dialog control server 12 includes an input speech text accepting unit 121, dialog control modules 122, and a response text sending unit 123. There may be multiple dialog control modules 122, for example, so as to support cases in which later described branching occurs.

The dialog control server 12 accepts the input speech text generated by the speech recognition server 11, and generates a response text that is a response to the input speech text. Also in the case in which an input speech from the user terminals 18 is accepted, the dialog control server 12 generates a response text that is a response to an input speech text corresponding to the input speech, from the input speech text.

Furthermore, in the dialog control server 12, previous input speech texts and response texts are stored as a dialog history, which can be transmitted in response to a request from a client. The dialog control and the history management have to be performed for each client, and thus the dialog control server typically holds dialog control modules respectively corresponding to clients. Note that the clients in this example are, for example, the user terminals 18, but may also be other apparatuses.

The dialog control server 12 may accept point information indicating one point in dialog information of a series of dialog. In this case, the dialog control server 12 can generate a response text that is a response to the accepted input speech text, using the dialog information up to the point indicated by the point information, in the dialog information of the series of dialog. The dialog information is information of a history of a series of dialog. The dialog information typically has an input speech text, one or more input speech translation results, a response text, and one or more response translation results. The input speech text is a speech recognition result of an input speech input by a user. The input speech translation results are translation results of the input speech text into languages other than the language of the input speech text. The response text is a response from the system to the input speech text. The response translation results are translation results of the response text into languages other than the language of the response text.

The input speech text accepting unit 121 constituting the dialog control server 12 accepts an input speech text. The input speech text accepting unit 121 typically receives an input speech text from the speech recognition server 11.

The dialog control modules 122 generate a response text that is a response corresponding to an input speech indicated by an input speech text accepted by the input speech text accepting unit 121, from the input speech text. There is no limitation on the algorithm of the dialog control modules 122. For the dialog control modules 122, for example, algorithms for generating a response text from an input speech text, described in JP 2013-168169A, JP 2011-248549A, JP 2009-211629A, Japanese Patent Application No. 2016-148984, and the like can be used. Various known algorithms can be used as algorithms for generating a response text from an input speech text.

Figure 4:
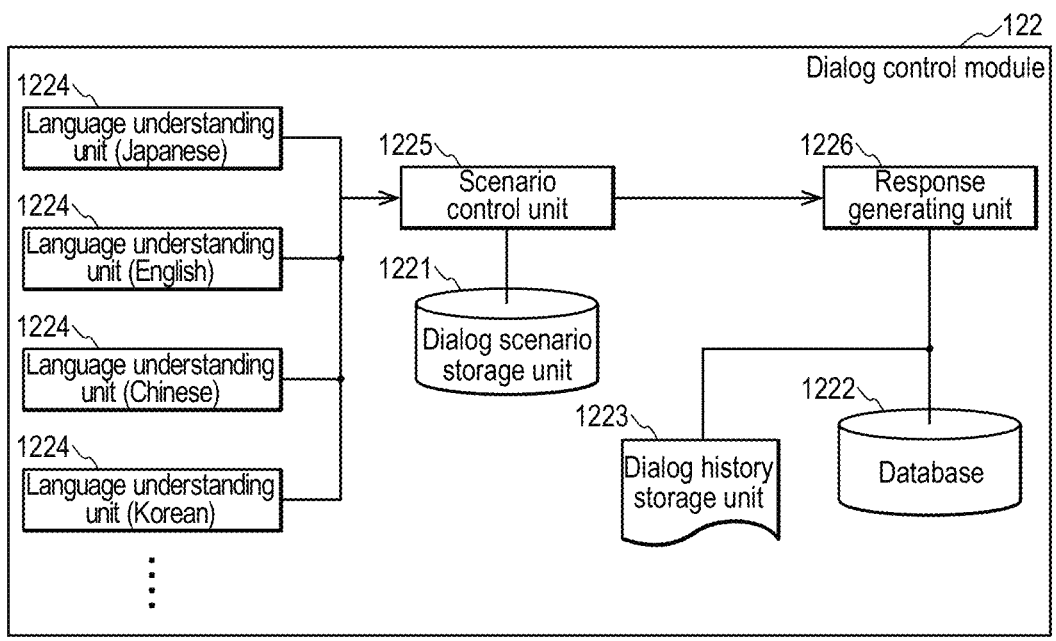
FIG. 4 is a block diagram of a dialog control module 122 constituting the dialog control server 12 in the embodiment.

FIG. 4 is an example of a block diagram of a dialog control module 122 constituting the dialog control server 12. The dialog control module 122 includes, for example, a dialog scenario storage unit 1221, a database 1222, a dialog history storage unit 1223, language understanding units 1224, a scenario control unit 1225, and a response generating unit 1226. In FIG. 4, the dialog control module 122 has multiple language understanding units 1224 respectively corresponding to languages, but it is also possible that one language understanding unit 1224 performs processing for multiple languages.

In the dialog scenario storage unit 1221 constituting the dialog control module 122, a dialog scenario for dialog control is stored. The dialog scenario is a scenario of a dialog, that is, information indicating the flow of a dialog.

The dialog scenario is, for example, the following dialog structure information. The dialog structure information is information indicating links between dialogs, and has one or more pieces of dialog link information. The dialog link information includes a first dialog action tag that abstracts a speech input by a first speaker (typically, a user), and a second dialog action tag that abstracts a speech output by a second speaker (typically, the spoken dialog system 1). Here, the first speaker is, for example, a user of the spoken dialog system 1. The second speaker is a virtual speaker in the spoken dialog system 1. One of the first dialog action tag and the second dialog action tag may be empty. Abstracting an input speech or an output speech means classifying the input speech or the output speech into a type, based on the significance or meaning of a sentence included in the input speech or the output speech. Classifying an input speech or an output speech into a type means determining one type out of multiple types, for the input speech or the output speech. A dialog action tag abstracted from an input speech or an output speech is information indicating the type of a dialog action. Examples of the information indicating the type of a dialog action include "q.spot", "q.weather", "q.how-to-take", "q.cost", "thanks", and the like. A dialog action tag "q.spot" represents a question about a sightseeing place, "q.weather" represents a question about today's weather, "q.how-to-take" is a question about how to get to a destination, "q.cost" is a question about the amount of money required to get to a destination, and "thanks" represents gratitude. Typically, a speech output from the second speaker is, for example, a speech responding to a speech input by the first speaker. Dialog link information may include a starting node identifier, an ending node identifier, a first dialog action tag, and a second dialog action tag. Preferably, the dialog link information also includes weight information, which is information indicating the probability of a transition occurring from a node identified with the starting node identifier and a node identified with the ending node identifier. Preferably, the dialog link information also includes an operation identifier, which is information indicating an operation. The dialog link information includes the staring node identifier and the ending node identifier, and may also include one or more pieces of information among the first dialog action tag, the second dialog action tag, and the operation identifier. The operation identifier is, for example, a function name, a method name, or an execution module name, or the like. Here, a node represents a conceptual dialog state. Note that the starting node identifier is information for identifying a node that indicates the start point of a dialog. Similarly, the ending node identifier is information for identifying a node that indicates the end point of a dialog. The starting node identifier and the ending node identifier represent that one dialog (a question and an answer, etc.) is complete. Note that information indicating links between dialogs may be information indicating links using a starting node identifier included in dialog link information and an ending node identifier included in dialog link information, or may be information that indicates the links by linking pieces of dialog link information to each other using directed links. There are several types of operation identifiers, such as an operation identifier of pre-processing that is performed on a sentence input by the first speaker, an operation identifier of post-processing that is performed on a sentence output by the second speaker, and an operation identifier of other general processing. Each operation identifier may be applied to a different sentence or different information.

The database 1222 has information for generating a response text. Such information is, for example, information indicating a transportation route or the like, information of a transportation fee in transportation, information of the amount of time required in a route, or the like. However, there is no limitation on the type of the information.

In the dialog history storage unit 1223, a dialog history, that is, dialog information is stored. The dialog information is, for example, dialog sentences that have already appeared. Note that the dialog history storage unit 1223 may be in an unshown external storage medium. If the dialog history storage unit 1223 is in an external storage medium, the storage medium is accessible from the dialog control server 12.

The language understanding units 1224 perform processing for understanding an input speech text. Basically, the language understanding units 1224 are provided respectively for available languages. The language understanding units 1224 perform, for example, two processes below. (1) Convert an input speech text that is a speech recognition result, into a concept symbol independent of languages. (2) Extract a keyword for generating a response, such as a spot name or a time, from the input speech text.

The scenario control unit 1225 generates a command for generating a response text, using the processing result of the language understanding units 1224. For example, the scenario control unit 1225 generates a command for generating a response, while transitioning states on a dialog scenario, using, as input, the concept symbol and the keyword generated by the language understanding units 1224.

The response generating unit 1226 generates a response text from the response generating command generated by the scenario control unit 1225. Note that the cross-lingual spoken dialog system 1 of the present invention displays a response in all available languages, and thus response texts in all available languages are generated.

In the response generation, a route, a transportation fee, the amount of time required, and the like have to be looked up depending on the content of a speech (e.g., a question) input by a user, but the response generating unit 1226 acquires information of a route, a transportation fee, the amount of time required, and the like by referring to the database 1222 as necessary, and generates a response text using the information.

The response text sending unit 123 of FIG. 3 sends the response text generated by the response generating unit 1226. The sending in this example is typically transmitting. However, the sending may also be delivering to another module or the like.

Figure 5:
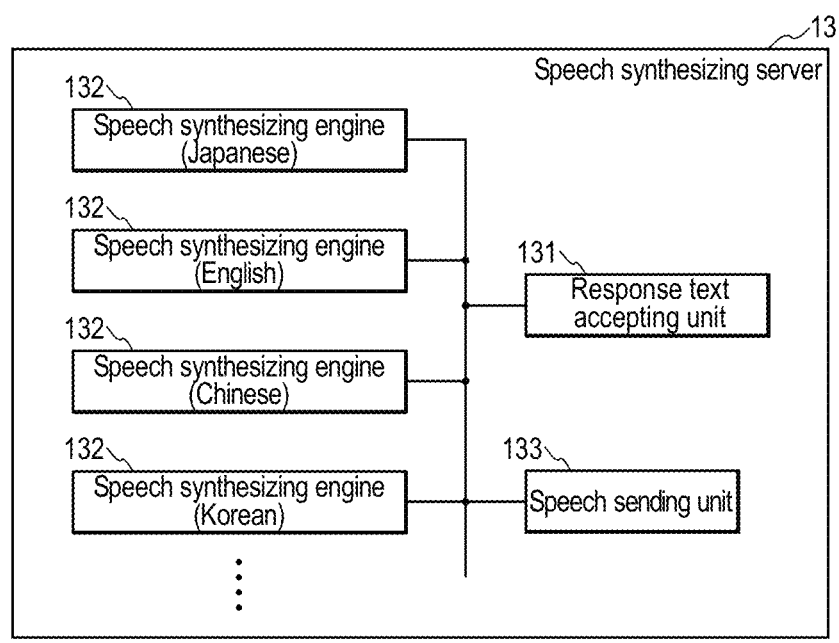
FIG. 5 is a block diagram of a speech synthesizing server 13 in the embodiment.

FIG. 5 is a block diagram of the speech synthesizing server 13. The speech synthesizing server 13 includes a response text accepting unit 131, speech synthesizing engines 132, and a speech sending unit 133. In FIG. 5, the speech synthesizing server 13 has multiple speech synthesizing engines 132 respectively corresponding to languages, but it is also possible that one speech synthesizing engine 132 performs speech synthesizing processing for multiple languages.

The speech synthesizing server 13 generates a speech according to the response text. The speech synthesizing server 13 generates a speech waveform corresponding to a response text transmitted from a client, and transmits it to the client. Note that the client in this example is, for example, the dialog control server 12, but may also be other apparatuses.

The response text accepting unit 131 constituting the speech synthesizing server 13 accepts the response text sent from the dialog control server 12.

The speech synthesizing engines 132 perform speech synthesizing processing on the response text accepted by the response text accepting unit 131, thereby acquiring a speech.

The speech sending unit 133 typically sends the speech acquired by the speech synthesizing engines 132 to the dialog client 16.

Figure 6:
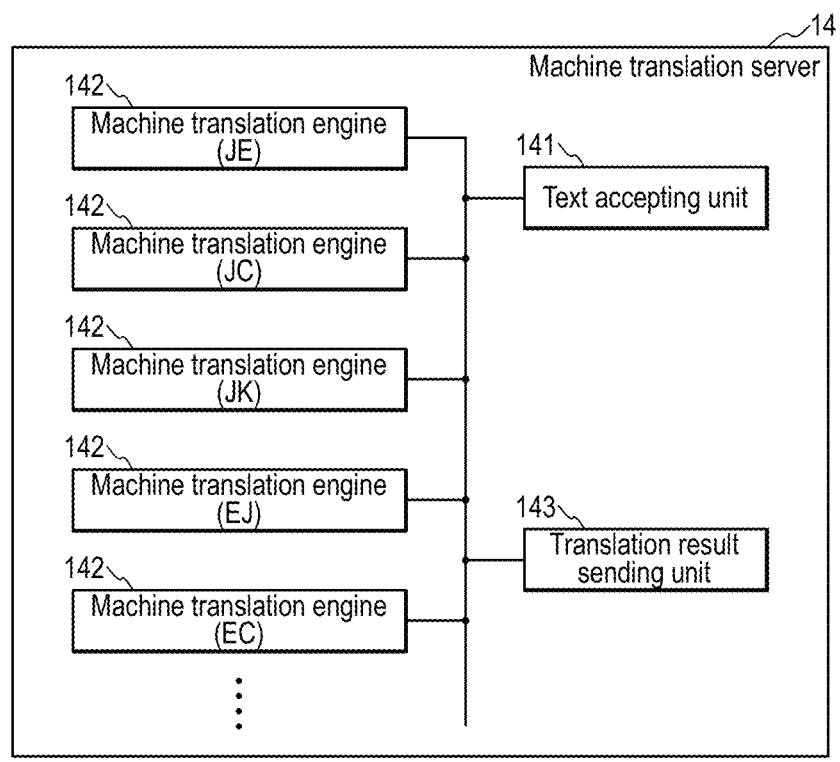
FIG. 6 is a block diagram of a machine translation server 14 in the embodiment.

FIG. 6 is a block diagram of the machine translation server 14. The machine translation server 14 includes a text accepting unit 141, machine translation engines 142, and a translation result sending unit 143. In FIG. 6, the machine translation server 14 has multiple machine translation engines 142 respectively corresponding to all language pairs, but it is also possible that one machine translation engine 142 performs machine translation processing for multiple language pairs.

The machine translation server 14 translates an input speech text into one or more languages other than a language of the input speech text, thereby acquiring one or more input speech translation results. Furthermore, the machine translation server 14 translates a response text into one or more languages other than a language of the response text, thereby acquiring one or more response translation results.

Specifically, for example, the machine translation server 14 generates texts in one or more target languages, from a text in an original language transmitted from a client, an ID (=language identifier) of the original language, and IDs of the target languages, and transmits them to the client. The machine translation server 14 auxiliarily uses live broadcast display for displaying a user input speech in all available languages other than an original language. FIG. 6 shows the internal configuration of the machine translation server 14 that includes the machine translation engines 142 in each of which one of the available languages is taken as an original language and another is taken as a target language. When the number of available languages is taken as N, N×(N−1) machine translation engines 142 may be prepared. Note that the machine translation server 14 is a known technique, and thus a detailed description thereof has been omitted. The client in this example is, for example, the speech recognition server 11, the dialog control server 12, or the user terminals 18, but may also be other apparatuses.

The text accepting unit 141 accepts an input speech text from the speech recognition server 11 and a response text from the dialog control server 12.

The machine translation engines 142 perform machine translation processing on the text accepted by the text accepting unit 141, thereby acquiring texts in target languages. The texts are one or more input speech translation results or one or more response translation results.

The translation result sending unit 143 sends the texts that are translation results acquired by the machine translation engines 142. The sending in this example is transmitting to a client.

Figure 7:
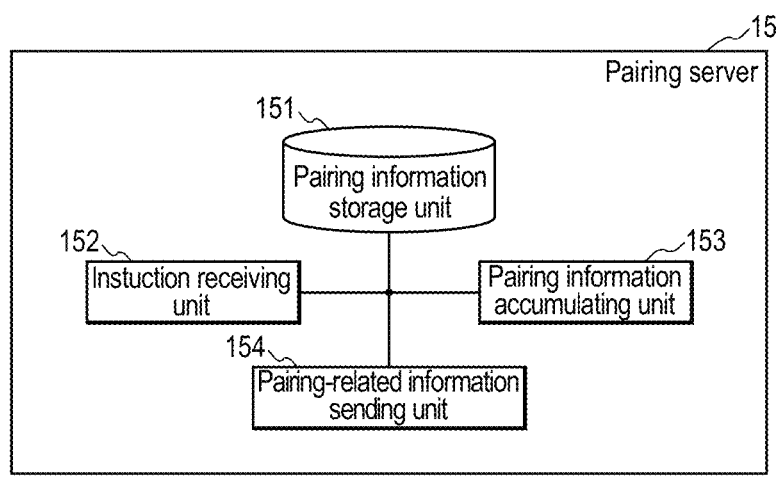
FIG. 7 is a block diagram of a pairing server 15 in the embodiment.

FIG. 7 is a block diagram of the pairing server 15. The pairing server 15 includes, for example, a pairing information storage unit 151, an instruction receiving unit 152, a pairing information accumulating unit 153, and a pairing-related information sending unit 154.

The pairing server 15 is used to perform pairing between the dialog client 16 (and the robot 17) and the user terminals 18. Typically, the pairing server 15 receives a pairing instruction from a user terminal 18, and performs pairing processing corresponding to the instruction. For example, the pairing server 15 receives a pairing instruction from a user terminal 18, and accumulates pairing information corresponding to the instruction. The pairing instruction contains, for example, a terminal identifier for identifying a user terminal 18, a URL of a storage area in which dialog information is stored, or the like.

In the pairing that is performed by the pairing server 15, existing techniques can be used, but, for example, a method including steps (1) to (4) below is used.
(1) The pairing server 15 is provided with a URL in advance. A session is established in advance between the dialog client 16 and the pairing server 15, so that data can be exchanged therebetween.
(2) A code (e.g., a QR code (registered trademark), a barcode, etc.) containing a URL, or the like is printed on the dialog client 16 or the robot 17.
(3) When application software of a code reader or the like is started on a user terminal 18, and an image of the code is captured by a camera of the user terminal 18, a session is established between the user terminal 18 and the pairing server 15.
(4) Since a session has been already established between the dialog client 16 and the pairing server 15, pairing between the dialog client 16 and the user terminal 18 is completed through (3).

In the pairing information storage unit 151 constituting the pairing server 15, one or more pieces of pairing information, which is information indicating pairing with the user terminals 18, are stored. The pairing information is, for example, a terminal identifier of each user terminal 18.

The instruction receiving unit 152 receives, for example, a pairing instruction having a terminal identifier. The instruction receiving unit 152 typically receives an instruction from the user terminal 18.

If the instruction receiving unit receives a pairing instruction, the pairing information accumulating unit 153 accumulates pairing information corresponding to the instruction, in the pairing information storage unit 151.

The pairing-related information sending unit 154 sends pairing-related information for performing pairing between the dialog client 16 and the user terminal 18. There is no limitation on the data structure and the like of the pairing-related information. The pairing-related information is, for example, a terminal identifier that is used by the dialog client 16 to transmit a text to the user terminal 18.

Figure 8:
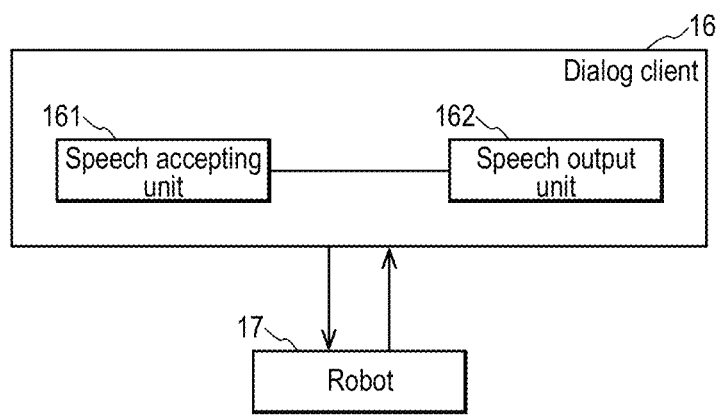
FIG. 8 is a block diagram of a dialog client 16 and a robot 17 in the embodiment.

FIG. 8 is a block diagram of the dialog client 16 and the robot 17. The dialog client 16 includes a speech accepting unit 161 and a speech output unit 162.

The dialog client 16 accepts and outputs a speech acquired by the speech synthesizing server 13. The outputting in this example is delivering to the robot 17. The dialog client 16 accepts an input speech from the robot 17.

The dialog client 16 is, for example, a module mainly for performing the following processing.
(1) Acquire a speech waveform from a microphone of the robot 17, transmit it to the speech recognition server 11, and receive a speech recognition result (response text) and a language identifier.
(2) Transmit the speech recognition result and the language identifier to the dialog control server 12, and receive response texts in all languages.
(3) Transmit a response text corresponding to a language that matches the language identifier, among the response texts in all languages, to the speech synthesizing server 13, and receive a speech waveform corresponding to the text.
(4) Output the received speech waveform from a speaker device of the robot 17.
(5) Receive a dialog history containing a user input speech, a system response, and the like from the dialog control server 12 as necessary, processing the information, and display it on a display screen or transmit it to the user terminal 18.

The speech accepting unit 161 constituting the dialog client 16 accepts an input speech. The accepting in this example is typically receiving from the robot 17.

The speech output unit 162 sends the input speech accepted by the speech accepting unit 161 to the speech recognition server 11. The speech output unit 162 sends the speech accepted from the speech synthesizing server 13 to the robot 17.

The robot 17 accepts an input speech from a user. The robot 17 outputs the speech according to the response text.

The output in this example is typically outputting voice. If the robot 17 has a display screen, it is preferable that an input speech text, one or more input speech translation results, a response text, and one or more response translation results are displayed on the display screen. Note that such display is referred to as live broadcast display.

Figure 9:
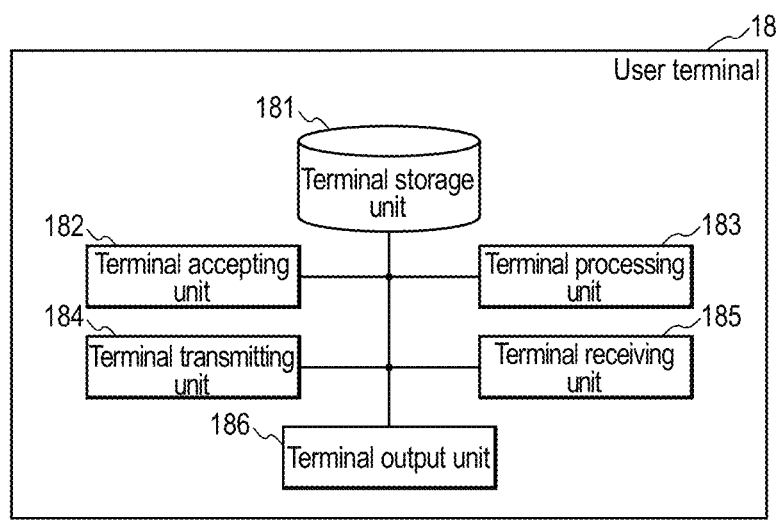
FIG. 9 is a block diagram of a user terminal 18 in the embodiment.

FIG. 9 is a block diagram of a user terminal 18. The user terminal 18 includes a terminal storage unit 181, a terminal accepting unit 182, a terminal processing unit 183, a terminal transmitting unit 184, a terminal receiving unit 185, and a terminal output unit 186.

The user terminal 18 is a terminal that is held by a user who joins a dialog. Typically, the user terminal 18 can display sentences in a language that the user understands, among the sentences that are displayed in the live broadcast display, and can perform taking out of a virtual agent, synchronization and branching, and the like. The taking out of a virtual agent, synchronization and branching, and the like will be described later in detail.

In the terminal storage unit 181 constituting the user terminal 18, various types of information are stored. The various types of information are, for example, a language identifier for identifying a language that is used by a user, a terminal identifier for identifying a user terminal 18, or the like.

The terminal accepting unit 182 accepts various types of information, instructions, and the like, such as an input speech or a pairing instruction. The various types of information, instructions, and the like may be input via any part such as a microphone, a camera, a touch panel, a menu screen, or the like. The terminal accepting unit 182 may be realized by a device driver for an input part, control software for a menu screen, or the like.

The terminal processing unit 183 performs various types of processing. The various types of processing are, for example, filtering processing that acquires a text corresponding to a language identifier in the terminal storage unit 181, from received dialog information, processing that constructs information, instructions, or the like that is to be transmitted, from information, instructions, or the like accepted by the terminal accepting unit 182, processing that constructs information that is to be displayed, from information received by the terminal receiving unit 185, or the like.

The terminal transmitting unit 184 transmits various types of information, instructions, and the like. The terminal transmitting unit 184 transmits, for example, a pairing instruction at a point during a series of dialog with the spoken dialog system 1.

The terminal receiving unit 185 receives various types of information. The terminal receiving unit 185 receives, for example, dialog information, which is information of a series of dialog up to that time, in response to transmission of the pairing instruction.

The terminal output unit 186 filters the information received by the terminal receiving unit 185, and outputs the thus obtained information. It is preferable that the terminal output unit 186 outputs only information in a language that is identified with the language identifier, in the dialog information received by the terminal receiving unit 185. That is to say, it is preferable that the terminal output unit 186 outputs only a text extracted as a result of filtering processing performed by the terminal processing unit 183.

The language identifying unit 112, the speech recognition engines 113, the language understanding units 1224, the scenario control unit 1225, the response generating unit 1226, the speech synthesizing engines 132, the machine translation engines 142, the pairing information accumulating unit 153, and the terminal processing unit 183 may be realized typically by MPUs, memories, or the like. Typically, the processing procedure of the language identifying unit 112 and the like is realized by software, and the software is stored in a storage medium such as a ROM. Note that the processing procedure may also be realized by hardware (dedicated circuits).

The speech accepting unit 111, the input speech text accepting unit 121, the response text accepting unit 131, the text accepting unit 141, the instruction receiving unit 152, the speech accepting unit 161, and the terminal receiving unit 185 are realized typically by wireless or wired communication parts, but may also be realized by broadcast receiving parts.

The input speech text sending unit 114, the response text sending unit 123, the speech sending unit 133, the translation result sending unit 143, the pairing-related information sending unit 154, the speech output unit 162, and the terminal transmitting unit 184 are realized typically by wireless or wired communication parts, but may also be realized by broadcasting parts.

The terminal output unit 186 is constituted by an output device such as a display screen or a speaker device, and driver software for the output device.

Next, an operation of the spoken dialog system 1 will be described. First, an operation of the dialog control server 12 will be described with reference to the flowchart in FIG. 10.

(Step S1001) The input speech text accepting unit 121 determines whether or not it has accepted an input speech text. If it has accepted an input speech text, the procedure advances to step S1002, and, if not, the procedure advances to step s1006.

(Step S1002) The dialog control module 122 generates a response text corresponding to the input speech text accepted in step S1001, from the input speech text.

(Step S1003) The response text sending unit 123 sends the response text and the like generated in step S1002. The response text and the like are typically a response text, or an input speech text and a response text. The response text sending unit 123 sends, for example, the response text to the speech synthesizing server and the dialog client 16. The response text sending unit 123 sends, for example, the input speech text and the response text to the machine translation server 14.

(Step S1004) The text accepting unit 121 of the dialog control server 12 determines whether or not it has accepted a translation result, which is a processing result by the machine translation server 14. If it has accepted a translation result, the procedure advances to step S1005, and, if not, step S1004 is repeated. Note that the translation result is one or more input speech translation results, or one or more input speech translation results and one or more response translation results. The input speech translation results and the response translation results are typically associated with language identifiers for identifying languages.

(Step S1005) An unshown processing unit of the dialog control server 12 accumulates, for example, the input speech text, the response text, and the translation results in the dialog history storage unit 1223 of the dialog control module 122, and the procedure returns to step S1001.

(Step S1006) An unshown accepting unit of the dialog control server 12 determines whether or not it has accepted pairing-related information. If it has accepted pairing-related information, the procedure advances to step S1007, and, if not, the procedure advances to step S1009. Note that the pairing-related information is accepted in the case in which pairing between the dialog client 16 (and the robot 17) and the user terminal 18 is performed.

(Step S1007) An unshown processing unit of the dialog control server 12 acquires dialog information indicating the content of a series of dialog up to that time, from the dialog history storage unit 1223 of the dialog control module 122.

(Step S1008) An unshown transmitting unit of the dialog control server 12 transmits the dialog information acquired in step S1007 to the user terminal 18 corresponding to the pairing-related information, and the procedure returns to step S1001.

(Step S1009) An unshown receiving unit of the dialog control server 12 determines whether or not it has accepted information from any user terminal 18. If it has accepted information from any user terminal 18, the procedure advances to step S1010, and, if not, the procedure returns to step S1001. Note that the information that is accepted typically contains an input speech text and point information.

(Step S1010) The dialog control module 122 acquires point information from the information from the user terminal 18.

(Step S1011) The dialog control module 122 generates a response text from an input speech text contained in the information from the user terminal 18, using dialog information up to a point corresponding to the point information acquired in step S1010.

(Step S1012) An unshown transmitting unit of the dialog control server 12 transmits, for example, the response text and the like also containing the input speech text, to the user terminal 18 that transmitted the information.

(Step S1013) An unshown processing unit of the dialog control server 12 accumulates the input speech text and the response text in association with the terminal identifier, and the procedure returns to step S1001.

Figure 10:
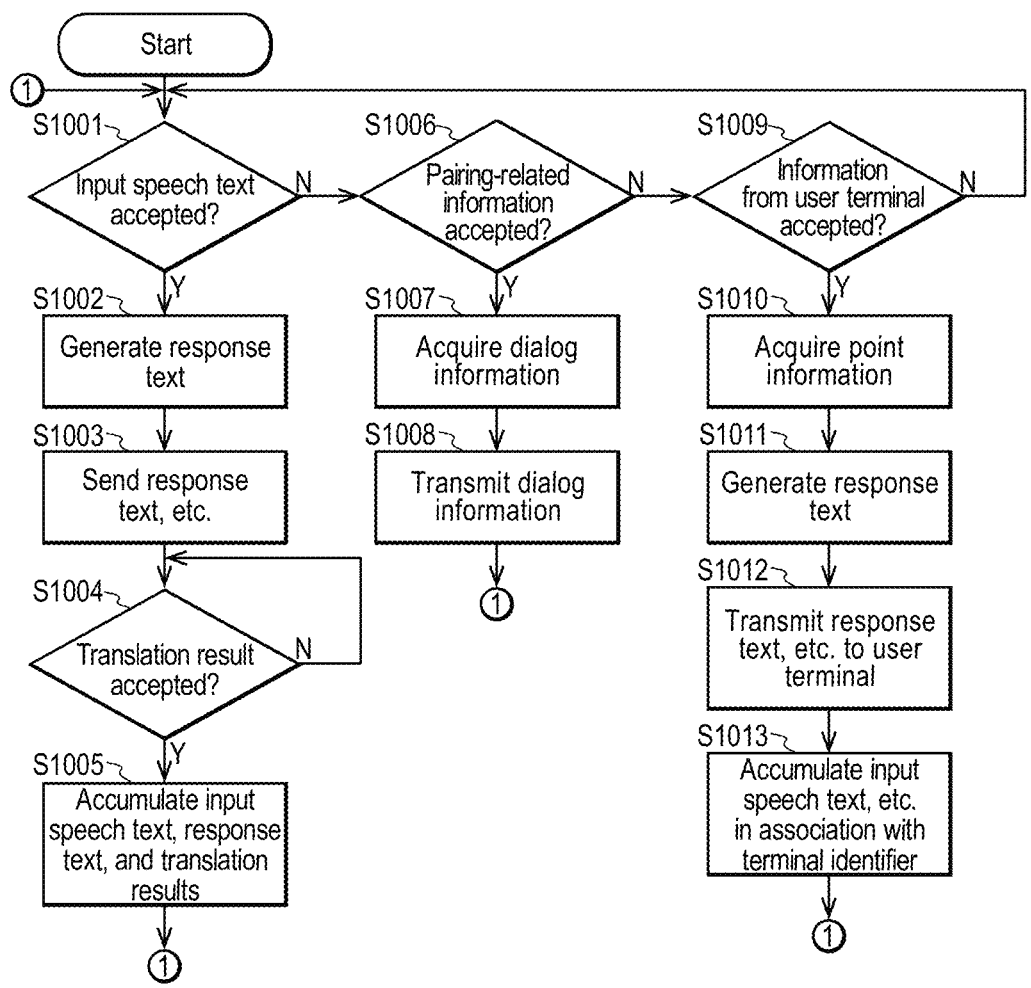
FIG. 10 is a flowchart illustrating an operation of the dialog control server 12 in the embodiment.

Note that the procedure is terminated by powering off or an interruption at the end of the process in the flowchart in FIG. 10.

Next, an operation of the user terminal 18 will be described with reference to the flowchart in FIG. 11.

(Step S1101) The terminal accepting unit 182 determines whether or not it has accepted a pairing instruction. If it has accepted a pairing instruction, the procedure advances to step S1102, and, if not, the procedure advances to step S1106. Note that a pairing instruction is accepted, for example, by reading a QR code using an unshown camera of the user terminal 18 or starting communication using Bluetooth (registered trademark).

(Step S1102) The terminal transmitting unit 184 transmits the pairing instruction accepted in step S1101, to the pairing server 15.

(Step S1103) The terminal receiving unit 185 determines whether or not it has received dialog information, in response to transmission of the pairing instruction in step S1102. If it has received dialog information, the procedure advances to step S1104, and, if not, step S1103 is repeated.

(Step S1104) The terminal processing unit 183 performs filtering processing that acquires a text corresponding to a language identifier in the terminal storage unit 181, from the dialog information received in step S1103.

(Step S1105) The terminal output unit 186 outputs dialog information, which is the text acquired in step S1104, and the procedure returns to step S1101.

(Step S1106) The terminal receiving unit 185 determines whether or not it has received a text. If it has received a text, the procedure advances to step S1107, and, if not, the procedure advances to step S1109. Note that the text in this example is, for example, information of a real-time dialog that is performed between another user and the robot 17 after the pairing, and is information of a dialog in the case in which the display on the robot 17 and the display on the user terminal 18 are synchronized with each other. The text in this example is, for example, information of a dialog in the case in which, after the pairing, the user terminal 18 branches from the synchronization with the robot 17 and the user independently has a dialog with the spoken dialog system 1.

(Step S1107) The terminal processing unit 183 performs filtering processing that acquires a text corresponding to a language identifier in the terminal storage unit 181, from the text received in step S1106.

(Step S1108) The terminal output unit 186 outputs the text acquired through the filtering in step S1107, and the procedure returns to step S1101.

(Step S1109) The terminal accepting unit 182 determines whether or not it has accepted an input speech from a user. If it has accepted an input speech, the procedure advances to step S1110, and, if not, the procedure returns to step S1101.

(Step S1110) The terminal processing unit 183 acquires point information. The point information is, for example, information indicating a currently focused point in an input speech text or response text, in the dialog information of a series of dialog. The point information may also be, for example, information indicating a point in an input speech text or a response text instructed by a user, in the dialog information that has been output.

(Step S1111) The terminal transmitting unit 184 transmits the input speech accepted in step S1109 and the point information acquired in step S1110, and the procedure returns to step S1101. Note that the terminal transmitting unit 184 transmits the input speech and the point information typically to the dialog control server 12.

Figure 11:
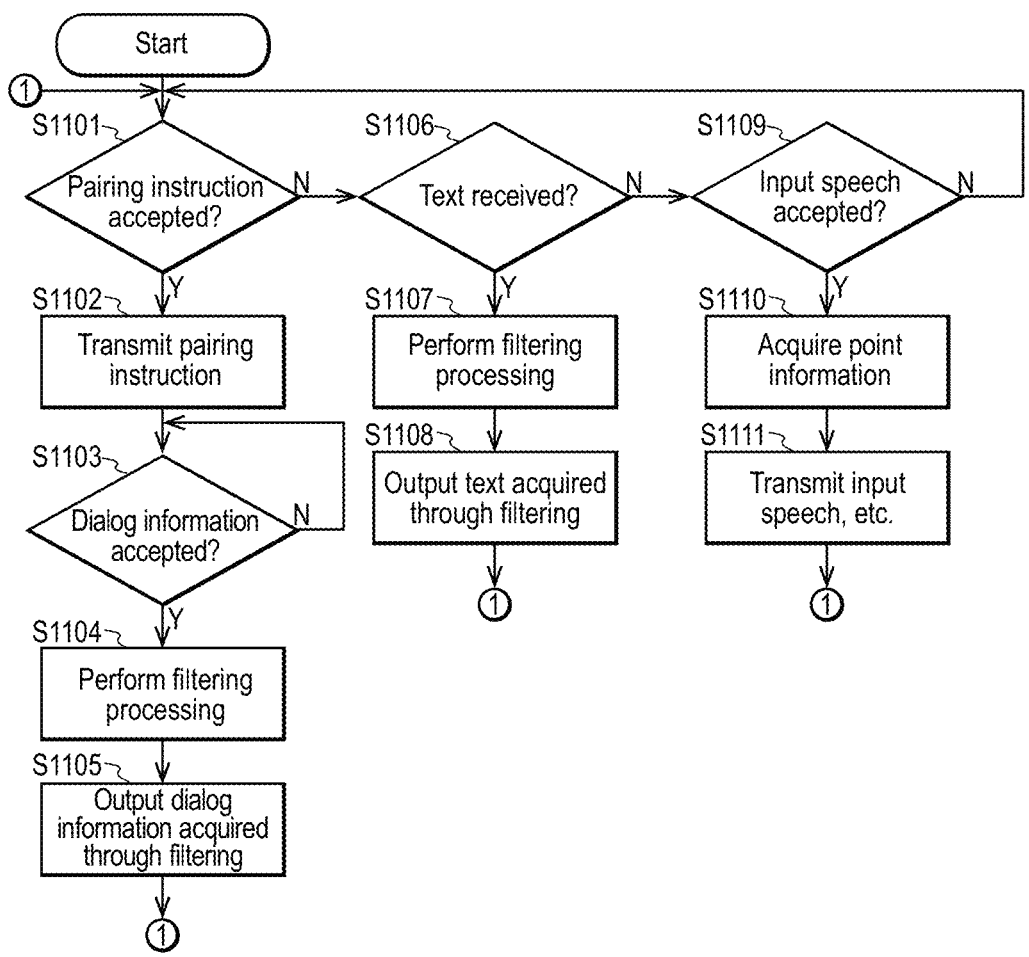
FIG. 11 is a flowchart illustrating an operation of the user terminal 18 in the embodiment.

Note that the procedure is terminated by powering off or an interruption at the end of the process in the flowchart in FIG. 11.

Hereinafter, a specific operation of the spoken dialog system 1 in this embodiment will be described. FIG. 1 shows a system configuration diagram of the spoken dialog system 1.

As described above, the live broadcast display in conventional spoken dialog systems has problems (A) to (C) as described in "Technical Problem".

Figure 12:
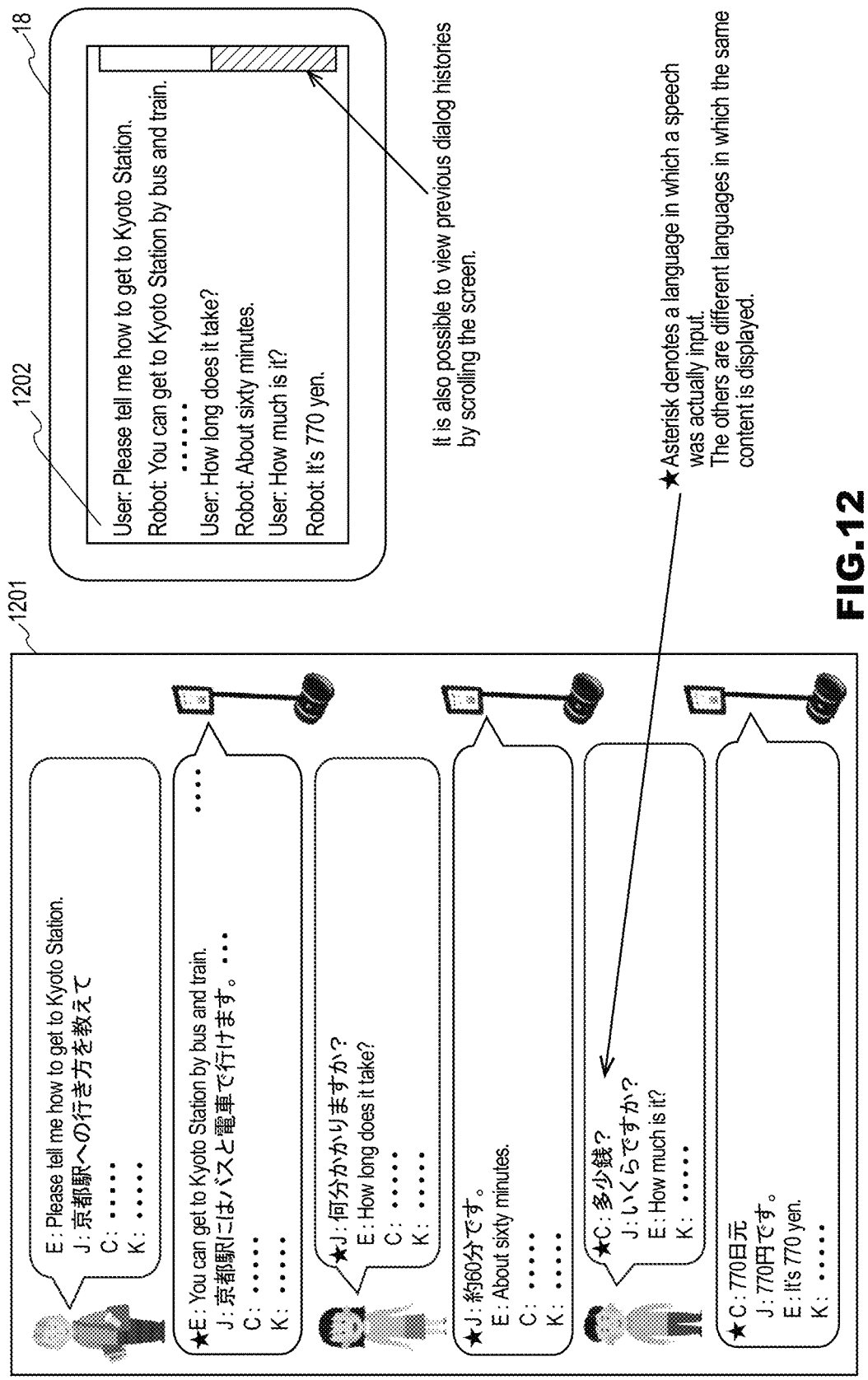
FIG. 12 is a diagram showing a display example in the embodiment.

The spoken dialog system 1 has the following solving means for solving the problems (A) and (B). That is to say, the spoken dialog system 1 has a mechanism in which the content similar to that on the live broadcast display is displayed on the user terminal 18 owned by each user. FIG. 12 shows an example of the display. In FIG. 12, 1201 denotes conventional live broadcast display in which speeches (user input speeches) input by users and responses (system responses) from the system embodied in the form of a robot are displayed in all available languages (four languages, i.e., J, E, C, and K, in FIG. 12). Note that the asterisks in 1201 denote character strings in languages that were actually input.

On the other hand, on the user terminal 18, the character strings are displayed only in a language (Japanese in 1202) that is usually used by the owner of that user terminal 18, using information such as display language settings of the terminal (the same as the above-described language identifier). Furthermore, not only recent user input speeches and system responses, but also user input speeches and system responses from the start of a dialog session to current time are displayed. Contrary to the live broadcast display, the user terminal 18 can be operated by each user, and thus the user can view previous communication in the dialog on the display screen of the user terminal 18 through scrolling or the like, in a language that the user understands.

With this configuration, even in the spoken dialog system 1 without a display screen, it is possible for users to understand the content of a current dialog. Furthermore, it is also possible to view communication of dialogs prior to those that can be displayed in the live broadcast display, and thus it is possible for even users who come to an area with the spoken dialog system 1, in particular, the robot 17 at a point during the dialog, to understand the content of a dialog up to that time and easily join the dialog.

In order to link the spoken dialog system 1 and the user terminal 18, an operation such as pairing is necessary between them. Examples of the pairing means include existing methods (1) and (2) as below.
(1) Print a QR code containing a predetermined URL on a dialog system (the main body of the robot 17, etc.) and read the QR code using a QR code reader of the user terminal 18, so that the user terminal 18 accesses a predetermined URL and pairing with the dialog system is performed.
(2) Use the pairing mechanism of Bluetooth.

Furthermore, the spoken dialog system 1 has the following solving means for solving the problem (C). That is to say, in the spoken dialog system 1, a virtual agent corresponding to the robot 17 or the like is prepared, and a "taking out" and "synchronization and branching" mechanism of that virtual agent is introduced. Note that the virtual agent is a character that is in application software for having a spoken dialog on the user terminal 18. Hereinafter, the actual dialog system and the character in the user terminal 18 are respectively referred to as a dialog robot and a virtual agent, and are distinguished from each other.

When pairing is performed between the spoken dialog system 1 and the user terminal 18, the dialog robot 17 and the user terminal 18 are synchronized with each other. Thus, the display screen of the user terminal 18 displays sentences with the same content as that in the live broadcast display, typically in a language that the user understands. Note that the language of sentences that are displayed on the user terminal 18 is matched to the display language settings of the user terminal 18. As described in FIG. 12, the user terminal 18 also displays previous communication in the dialog.

If a user inputs a speech to the dialog robot 17 in a synchronized state, a response is output from the robot 17 in the same language as that of the user input speech. Moreover, the live broadcast display displays the user input speech and the robot response in all languages, and, in synchronization therewith, the user terminal 18 also displays the user input speech and the robot response. The dialog robot and the virtual agent are kept synchronized with each other as long as the user inputs speeches to the dialog robot.

On the other hand, if a user inputs a speech to the user terminal 18 in a synchronized state, the synchronization is canceled, and a response is output only from the user terminal 18. Then, a virtual agent 1301 appears in the user terminal 18. This is referred to as "taking out of a virtual agent". In this stage, the display of the user terminal 18 is as in FIG. 13. Note that the virtual agent is imitative of the system, and is a virtual dialog robot that is displayed on the user terminal 18.

Figure 13:
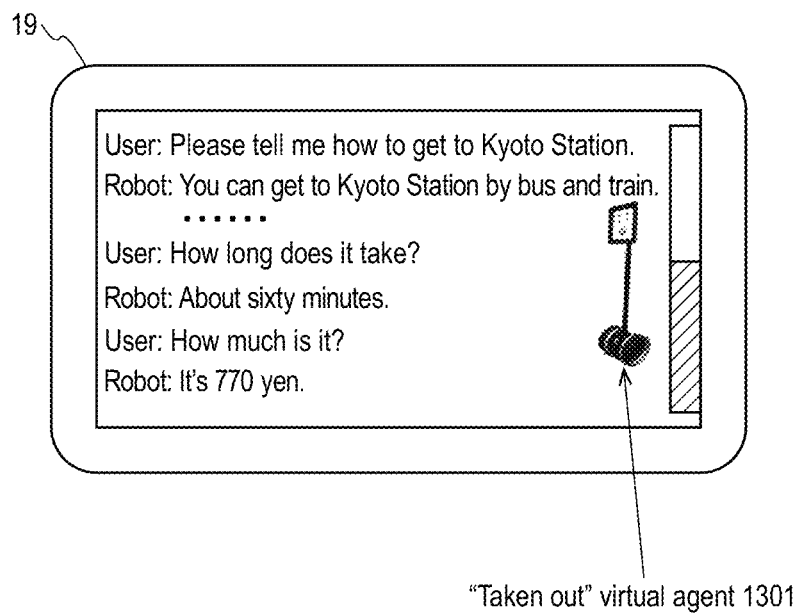
FIG. 13 is a diagram showing a display example in the embodiment.

FIG. 13 shows an example of the display of the user terminal 18 in such a state. In FIG. 13, the virtual agent 1301 is displayed on the user terminal 18 before sentences of a speech input by a user to the user terminal 18 are displayed, but, as shown in FIG. 14 below, it is also possible that the virtual agent 1301 is displayed together with sentences of a speech input to the user terminal 18 and the like, or after display of these sentences and the like.

Figure 14:
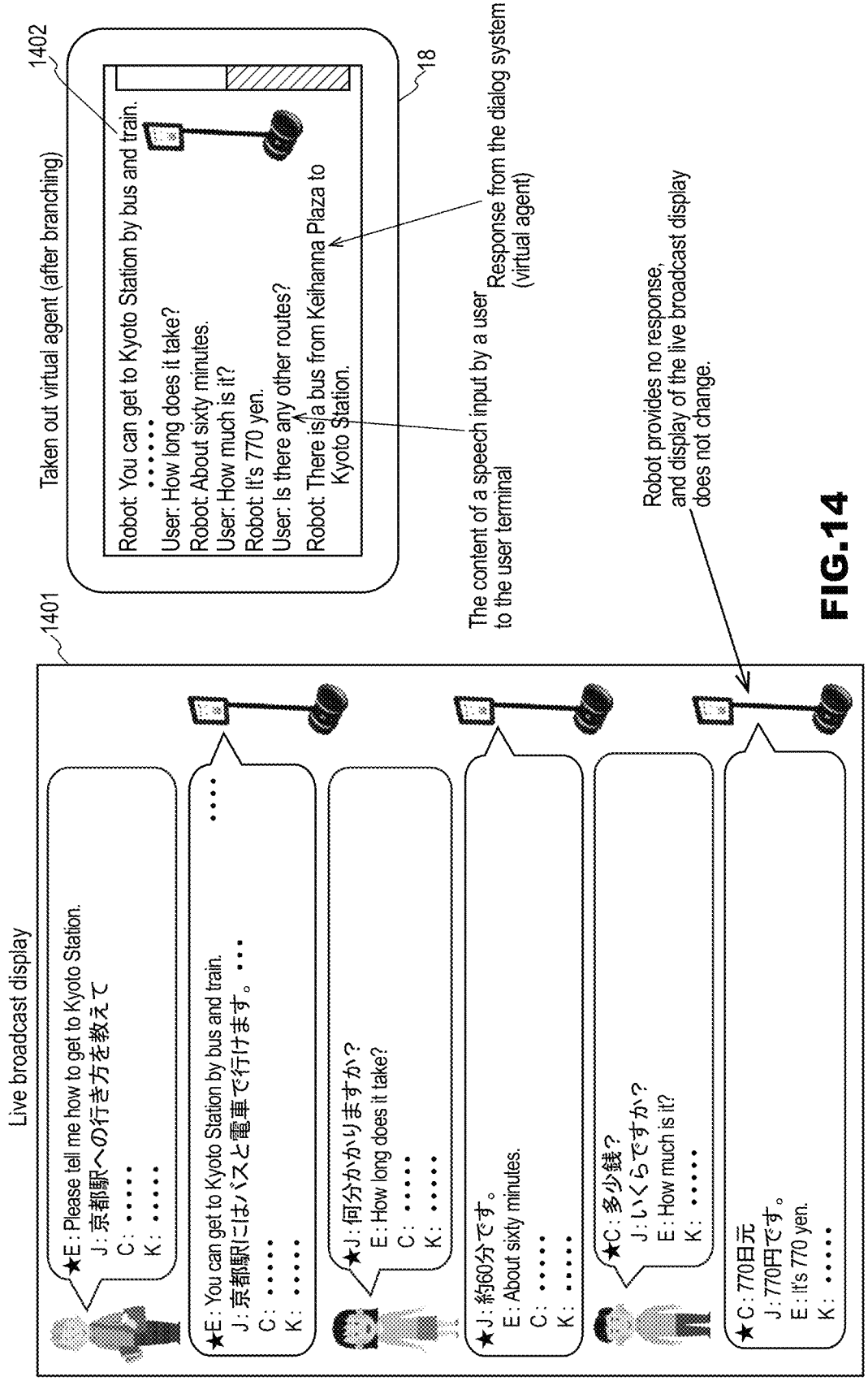
FIG. 14 is a diagram showing a display example in the embodiment.

FIG. 14 shows a state in which sentences of a speech input by a user to the user terminal 18 and the like are also displayed. In FIG. 14, a situation is assumed in which a user inputs a speech "Is there any other routes?" in Japanese to the user terminal 18. Since the dialog up to that time is about how to get to Kyoto Station, the spoken dialog system 1 understands that the user is asking if there are any other routes to Kyoto Station, and outputs a route as a response. Note that this output is performed only on the user terminal 18, and the output is not performed from the dialog robot 17 and the live broadcast display. That is to say, the state of the live broadcast display does not change from the state 1201 in FIG. 12.

Above, a mode was described in which, if a speech is input to the user terminal 18 and synchronization is canceled (i.e., if the user terminal 18 branches), a virtual agent appears, so that the user can see that it is a branch state.

However, it is also possible that a virtual agent is displayed on the user terminal 18 when pairing is performed between the spoken dialog system 1 and the user terminal 18, and, after which, if the user terminal 18 branches, the display mode (color, etc.) of the virtual agent is changed so that the user can see that it is a branch state.

Hereinafter, "synchronization and branching" will be further described. A user who has not joined a dialog yet (since FIG. 14 assumes the state in which three users who speak English, Japanese, and Chinese have already joined the dialog, this user is a fourth user) views communication of the dialog up to that time on the user terminal 18, and, if the user wants to join the dialog, the user only has to input a speech to the dialog robot 17. On the other hand, if the user wants to input a speech while taking over the flow of a dialog up to that time, but does not want to affect the dialog between the existing users and the dialog robot 17, the user only has to input a speech to his or her user terminal 18 so as not to be heard by the existing users. In the latter case, branching occurs between the dialog robot 17 and the virtual agent. Once branching occurs, the user does not have to be in the same area as the dialog robot 17, and can go to another area and continue the dialog.

Moreover, it is also possible to cause branching to occur back to any previous communication as long as it is in the same session of dialog. This aspect will be described with reference to FIG. 15.

Figure 15:
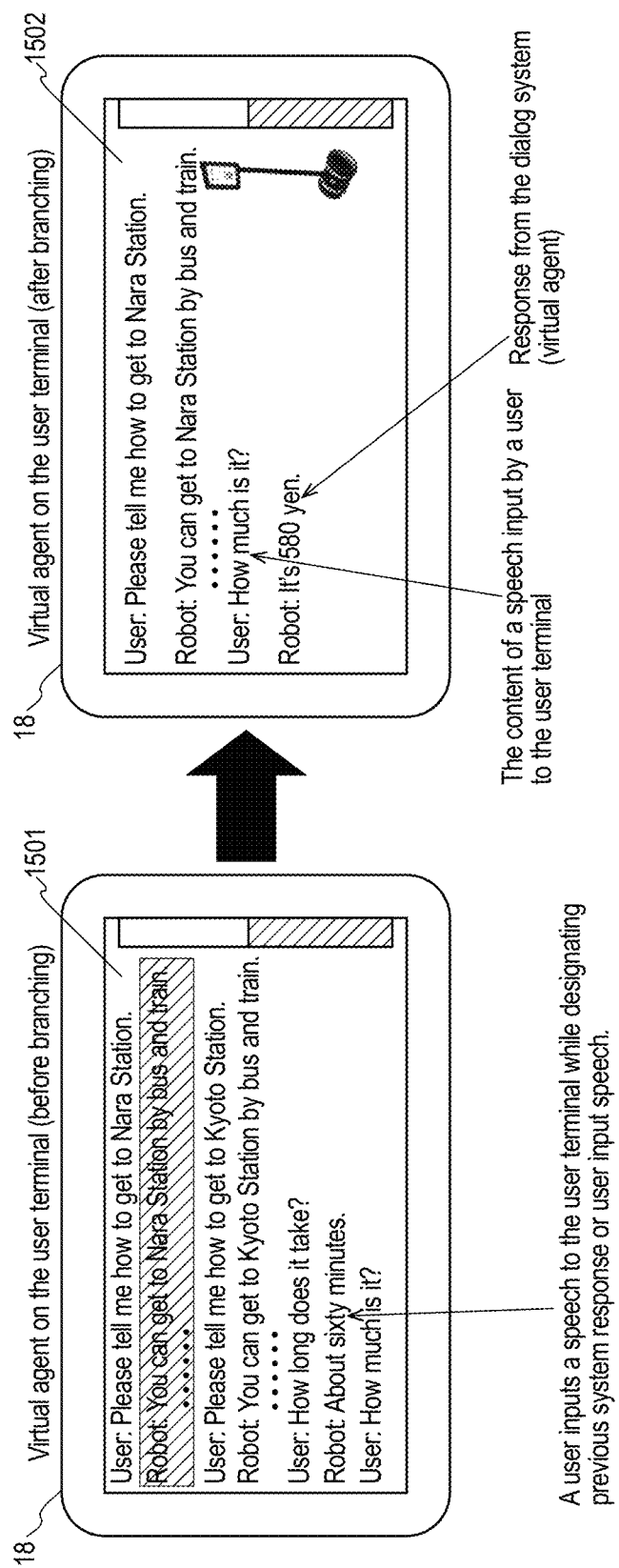
FIG. 15 is a diagram showing a display example in the embodiment.

In FIG. 15, it is assumed that a dialog about how to get to Nara Station was made before a dialog about how to get to Kyoto Station is made. A user (a fourth user who has not joined the dialog yet as in FIG. 14) views such a previous dialog on the user terminal 18, and wants to add a question about a transportation fee to Nara Station.

At the current time, the content of the dialog has been changed to a dialog about how to get to Kyoto Station as shown in FIG. 14, and thus if the user inputs a speech "How much is it?" to the dialog robot 17, the dialog robot 17 provides a response about the transportation fee not to Nara Station but to Kyoto Station. Note that, if the user inputs a speech "How much is it to Nara Station?" to the dialog robot 17, the robot will provide a response about the transportation fee to Nara Station, which changes the topic of the dialog, and thus existing users who want to continue the topic about a route to Kyoto Station will not be happy about this. In conventional systems, there are possibilities in which a new user worries about this point and may refrain from asking the question.

Thus, the user inputs a speech "How much is it?" while designating communication in the dialog at the time when the topic was about how to get to Nara Station on the user terminal 18 (the robot response "You can get to Nara Station by bus and train . . . (the rest is omitted)" or the user input speech "Please tell me how to get to Nara Station." in FIG. 15). In this case, the above-described point information is information for identifying the robot response "You can get to Nara Station by bus and train . . . (the rest is omitted)" or the user input speech "Please tell me how to get to Nara Station".

Then, the dialog system branches the dialog robot and the virtual agent at that point in time. As a result, the response "It's 580 yen." is output only from the user terminal 18. At the same time, in the virtual agent, communication after "You can get to Nara Station by bus and train . . . (the rest is omitted)" ("Please tell me how to get to Kyoto Station." and thereafter in FIG. 15) is deleted, and the current user input speech "How much is it?" and system response "It's 580 yen." are added.

If such a "taking out" and "synchronization and branching" mechanism of the virtual agent is introduced, a user who has not joined a dialog yet is unlikely to feel hesitant to join the dialog. That is to say, after taking out of a virtual agent, it is possible to continue the dialog back to any previous communication without limitation in terms of time or area.

Note that there are conventional techniques regarding taking out of a virtual agent itself, but the above-described technique is different from the conventional techniques in aspects (1) to (3) below. (1) It is possible to take out the dialog system in a state in which a dialog has progressed. (2) It is possible to branch a dialog from any point as long as a history of previous communication in the dialog is left. In other words, the case in which a dialog is branched back to the beginning of communication is the same as conventional "taking out". (3) It is a cross-lingual dialog system.

Figure 16:
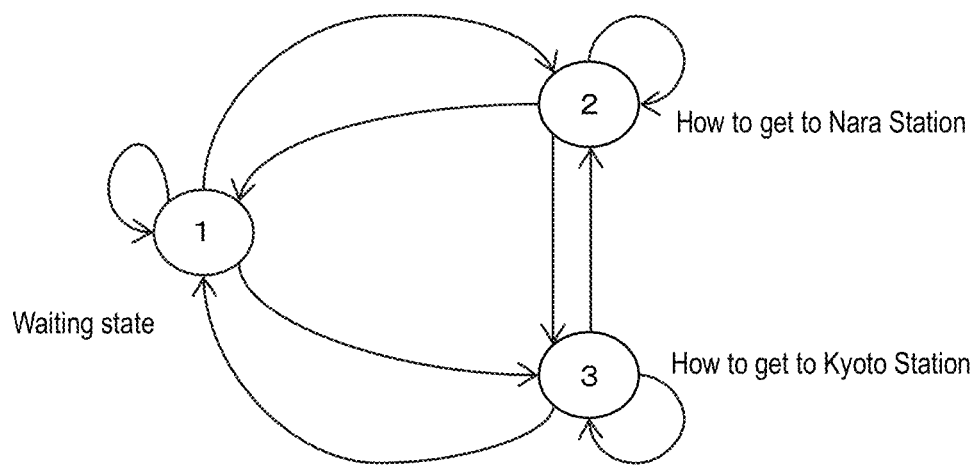
FIG. 16 is a diagram showing an example of a dialog scenario in the embodiment.

Next, an example of a dialog scenario stored in the dialog scenario storage unit 1221 constituting the dialog control module 122 will be described with reference to FIG. 16. In this diagram, states in a dialog scenario are expressed by automata in three states, wherein a circle is a state (node) and an arrow is an arc. In FIG. 16, state 1 refers to a state immediately after the start of a dialog. In this state, for example, if a speech asking a route to Nara Station is input, the state transitions to state 2. In state 2, if a speech asking a transportation fee or the amount of time required is input, the system understands that the questions are about the transportation fee and the amount of time required to Nara Station, and provides the corresponding responses.

On the other hand, if a speech asking a route to Kyoto Station is input, the state transitions to state 3. In state 3, if a speech asking a transportation fee or the amount of time required is input, the system understands that the questions are about the transportation fee and the amount of time required to Kyoto Station, and provides the corresponding responses.

Next, dialog information, which is a dialog history in the dialog history storage unit 1223, will be described with reference to FIG. 17. The dialog information is stored, for example, in a table form. The field "Speaker" is filled in with either "User" or "System", wherein the former indicates that the row is a user input speech, and the latter indicates that the row is a system response. "Speech language" shows what language was used in the user input speech or the system response. "Texts in all languages" shows the user input speech or the system response in all available languages. If the speaker is "System", the field holds response texts in all available languages generated by the response generating unit 1226. On the other hand, if the speaker is "User", a text in the same language as the speech language is acquired as a speech recognition result and is held, but texts in the other languages are translation results by the machine translation server 14. For example, in the uppermost row in FIG. 17, the speech language is Japanese, and thus Japanese "奈良駅への行き方を教えて" in "Texts in all languages" is a speech recognition result, but texts in the other languages are translation results through machine translation. "Scenario state" is a field in which a transition of a dialog scenario that occurs during response generation is stored. For example, in the table in FIG. 17, the first and second rows indicate that, when the dialog system 1 and the user have the following dialog, a transition occurs in the dialog scenario in FIG. 16 from state 1 to state 2 (see the record of the attribute value "state 1→state 2" in the scenario state in 1701).

If the scenario state is also stored in the above-described dialog history, in the case in which a user inputs a speech while designating any previous communication in the dialog as in FIG. 15, branching can be caused to occur therefrom.

Figure 18:
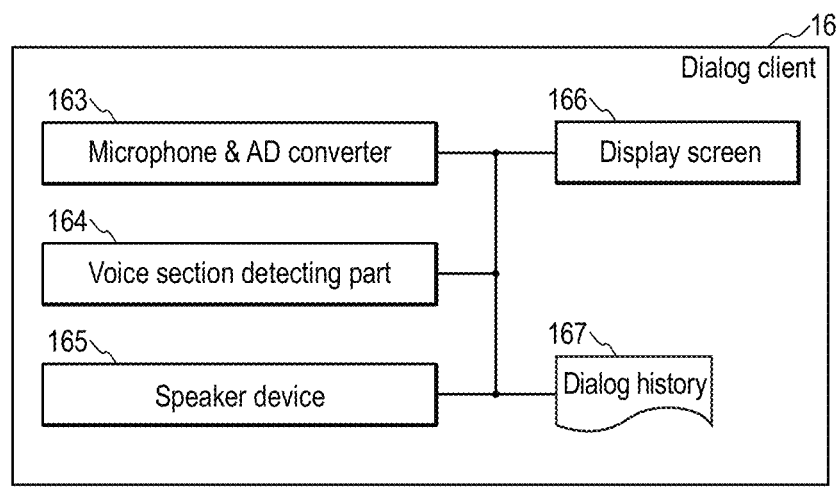
FIG. 18 is a diagram showing a detailed example of the dialog client 16 in the embodiment.

Next, a detailed example of the dialog client 16 will be described with reference to FIG. 18. A microphone & AD converter 163 constituting the dialog client 16 acquires a speech input by a user, and converts the speech into a speech waveform of a digital signal.

A voice section detecting part 164 performs processing that extracts a speech waveform of a portion corresponding to a section from a start point to an end point of a speech input by a user, in a waveform that is continuously input. This processing may be automatically performed, or may be processing that extracts a waveform when a user is pressing a predetermined button.

A speaker device 165 is used to output a speech waveform of a dialog response generated by the speech synthesizing server 13, as a sound.

A display screen 166 is used as the above-described live broadcast display.

A dialog history 167 is a copy of a dialog history in the dialog history storage unit 1223 included in the dialog control module 122 in FIG. 4. It is also possible that a copy of a dialog history is not held and is acquired from the dialog control module 122 as necessary. Note that the dialog history may be referred to as dialog information.

The microphone & AD converter 163 and the voice section detecting part 164 correspond to the speech accepting unit 161, and the speaker device 165 corresponds to the speech output unit 162.

Next, a method for realizing "taking out" and "synchronization and branching" of a virtual agent will be described.

Figure 19:
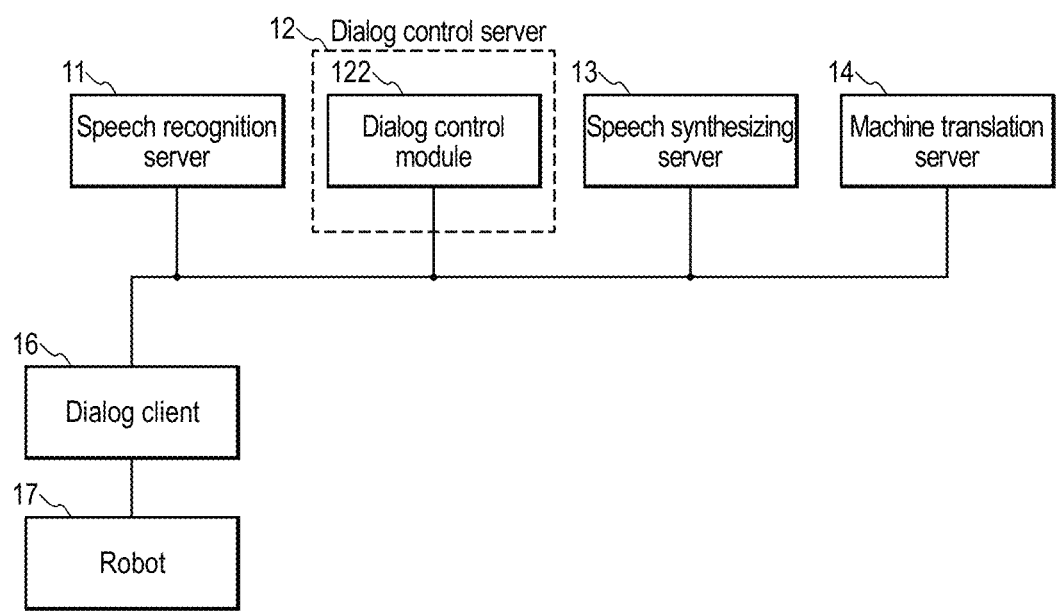
FIG. 19 is a diagram showing a state of the cross-lingual spoken dialog system 1 in the embodiment.

FIG. 19 shows a state before a virtual agent is taken out, which is the same as a conventional cross-lingual spoken dialog system 1. At that time, only one dialog control module 122 operates in the dialog control server 12. In this state, a cross-lingual dialog progresses between one or more users and the dialog robot 17.

Figure 20:
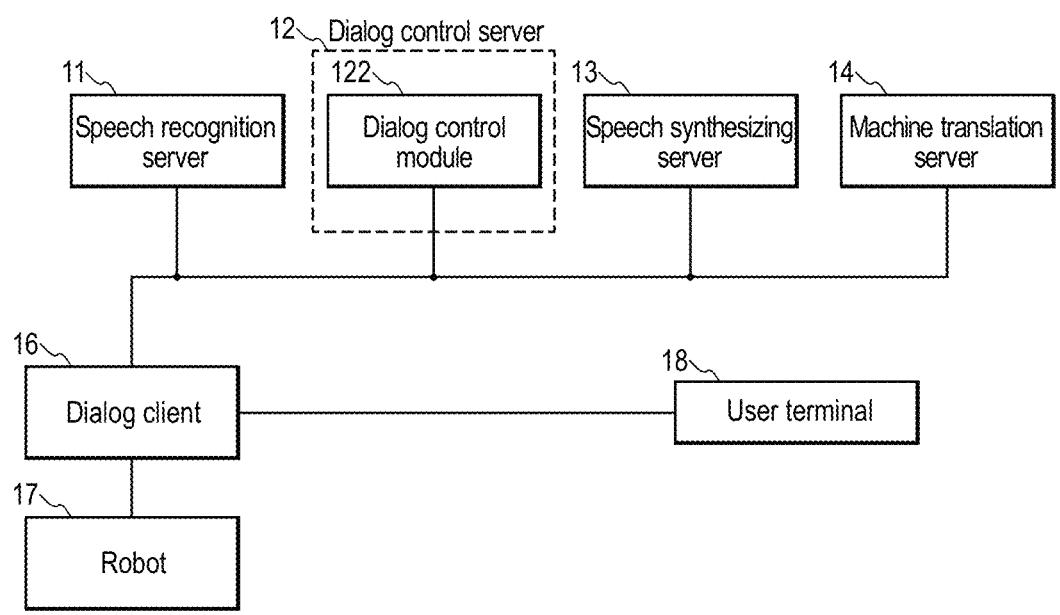
FIG. 20 is a diagram showing a state of the cross-lingual spoken dialog system 1 in the embodiment.

After a cross-lingual dialog has progressed between users and the dialog robot 17, if a user (which may be either an existing user or a new user) performs pairing between his or her user terminal 18 and the dialog client 16, as shown in FIG. 20, the dialog client 16 and the user terminal 18 are connected to each other. More specifically, the user terminal 18 and the dialog client 16 are connected via the pairing server 15, but, for the sake of simplicity of drawings, they are shown as being directly connected to each other.

The dialog client 16 transmits a dialog history internally held therein to the user terminal 18. Alternatively, a latest dialog history is acquired from the dialog control module 122 and transmitted to the user terminal 18. The dialog history holds, for example, texts in all languages, but the user terminal 18 acquires only a text in a language that matches display language settings through filtering, and displays the text, thereby performing the display as indicated by 1202 in FIG. 12.

If a user inputs a speech to the robot 17, the dialog history is updated at each input speech, and the dialog history is each time transmitted to the user terminal 18.

In this stage, the robot 17 and the user terminal 18 are synchronized with each other. In other words, it appears that there are two dialog agents consisting of the dialog robot 17 and the virtual agent, but the number of dialog control modules 122 that perform response generation and the like is only one, and thus there is only one dialog history.

Figure 21:
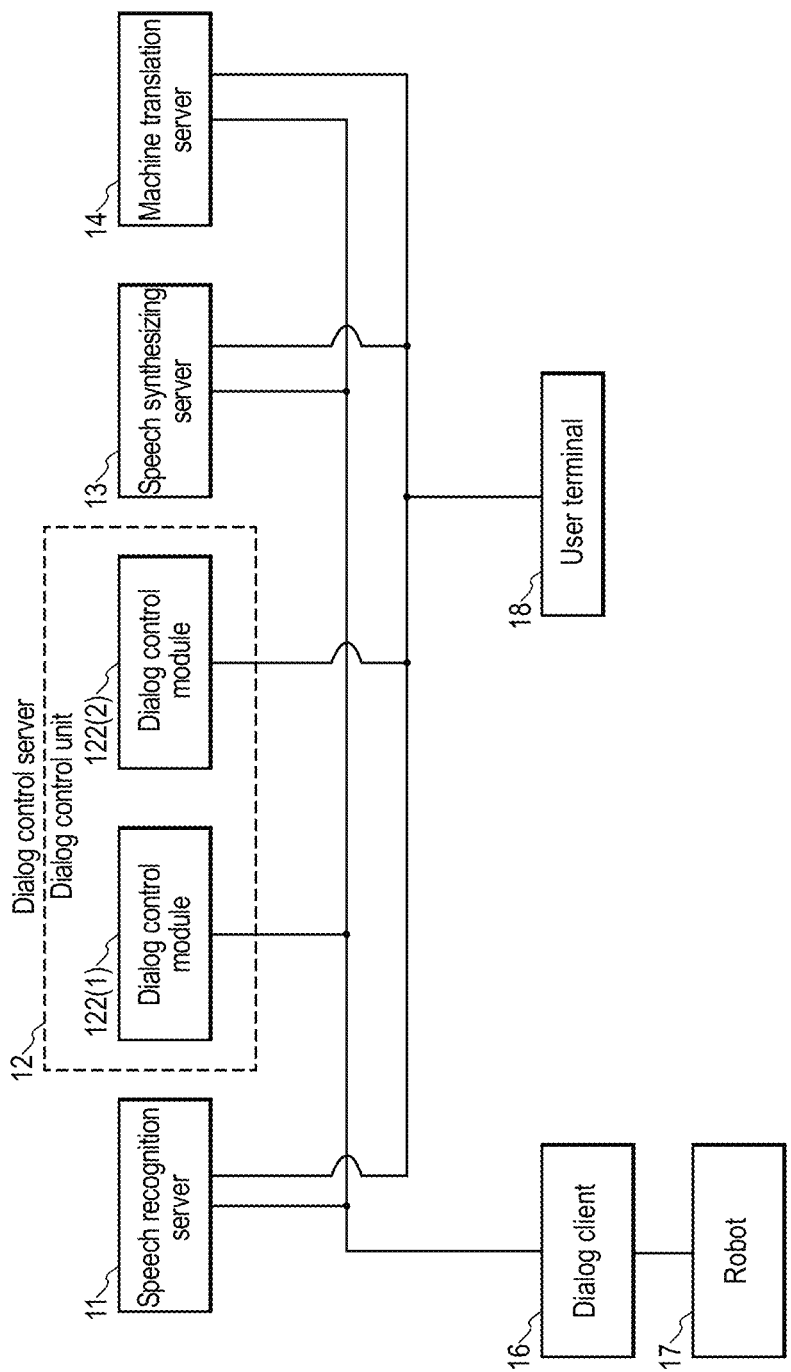
FIG. 21 is a diagram showing a state of the cross-lingual spoken dialog system 1 in the embodiment.

In this state, if a user inputs a speech to the user terminal 18, branching occurs between the robot 17 and the virtual agent. FIG. 21 shows a state after branching. In FIG. 21, the connection between the dialog client 16 and the user terminal 18 is canceled (the session is disconnected). That is to say, the dialog client 16 or the user terminal 18 disconnects the session.

On the other hand, in the dialog control server 12, the dialog control module 122 is duplicated. The duplicating refers to duplicating of each module in FIG. 4, but, if there is no problem, a common module may be referred to between an original and a copy. However, a dialog scenario and a dialog history are each copied in different memory spaces between the original and the copy, so that the original and the copy can separately update them. In the description below, an original of the dialog control module 122 is denoted by 122 (1), and a copy is denoted by 122 (2). The copy processing using point information will be described later in detail.

Through branching, the user terminal 18 is connected to 122 (2) (more specifically, they are connected via the pairing server 15). Furthermore, the user terminal 18 can directly access the speech recognition server 11 and the speech synthesizing server 13 (and the machine translation server 14, as necessary).

Once branching occurs, the dialog robot 17 and the virtual agent are respectively connected to different dialog control modules 122, and thus, when a speech is input to the user terminal 18, a response is output only from the user terminal 18, and is not output from the dialog robot 17, and vice versa.

After branching, in order to display user input speeches and system responses on the user terminal 18, the user terminal 18 acquires a dialog history not from the dialog client 16 but from the dialog control module 122(2), performs language-based filtering, and displays the thus acquired texts on the display screen. In FIG. 13, 1301 shows such a state.

Next, as another example of branching, a case in which a user inputs a speech to the user terminal 18 while designating any previous communication in the dialog as in FIG. 15 will be described.

Also in this case, the state after branching is as shown in FIG. 21, but the dialog history that is held by the dialog control module 122(2) is not as in FIG. 17 but as in FIG. 22. That is to say, the upper two rows (2201) in the table are the same, but a difference appears in the third row (2202) and thereafter. Hereinafter, this aspect will be described.

In 1501 of FIG. 15, a user inputs a speech "How much is it?" while designating the system response "You can get to Nara Station by bus and train . . . (the rest is omitted)" in the previous history. In FIG. 17, this system response corresponds to the second row in the table, and it is seen that, with this response, the dialog scenario transitions to state 2 (a state indicating a topic about how to get to Nara Station). Thus, the dialog control module 122 duplicates only the portion 1701, in duplication of the dialog history. This duplication is denoted by 2201 (or after the entire table in FIG. 17 is duplicated, the portion 1702 is deleted). Then, after the dialog scenario state is returned to state 2, response generation to the user input speech "How much is it?" is performed. As a result, a portion corresponding to 2202 is generated. This dialog history is transmitted to the user terminal 18, language-based filtering is performed, and then display as in 1502 is performed.

As described above, in the cross-lingual spoken dialog system according to this embodiment, even after a series of dialog between a user and the spoken dialog system has progressed to some extent, that user or another user can see or recognize a previous dialog status.

Furthermore, according to this embodiment, the spoken dialog system 1 and the user terminal 18 can be synchronized with each other.

Furthermore, according to this embodiment, if a user inputs a speech to the user terminal 18, synchronization is canceled, and branching of a dialog history can be caused to occur. That is to say, for example, second and subsequent users can continue a dialog independently of a first user from any point during the dialog, by inputting a speech to their own user terminals 18.

Furthermore, according to this embodiment, branching of a dialog can be performed back to previous communication in the dialog.

Furthermore, in this embodiment, the speech recognition server 11, the dialog control server 12, the speech synthesizing server 13, the machine translation server 14, the pairing server 15, the dialog client 16, and the robot 17 constituting the spoken dialog system 1 do not have to be separate devices. That is to say, the spoken dialog system 1 may be realized by one or at least two devices.

Moreover, the devices constituting the spoken dialog system 1 in this embodiment may be realized by software. The software may be distributed by software downloads or the like. Furthermore, the software may be distributed in a form where the software is stored in a storage medium such as a CD-ROM. Note that the same is applied to other embodiments described in this specification.

Embodiment 2

In this embodiment, an example of a case in which the speech recognition server 11, the dialog control server 12, the speech synthesizing server 13, the machine translation server 14, the pairing server 15, the dialog client 16, and the robot 17 constituting the spoken dialog system 1 in Embodiment 1 are realized by one spoken dialog device will be described. It will be appreciated that there is no limitation on the number of devices that realize the functions of the devices constituting the spoken dialog system 1.

Figure 23:
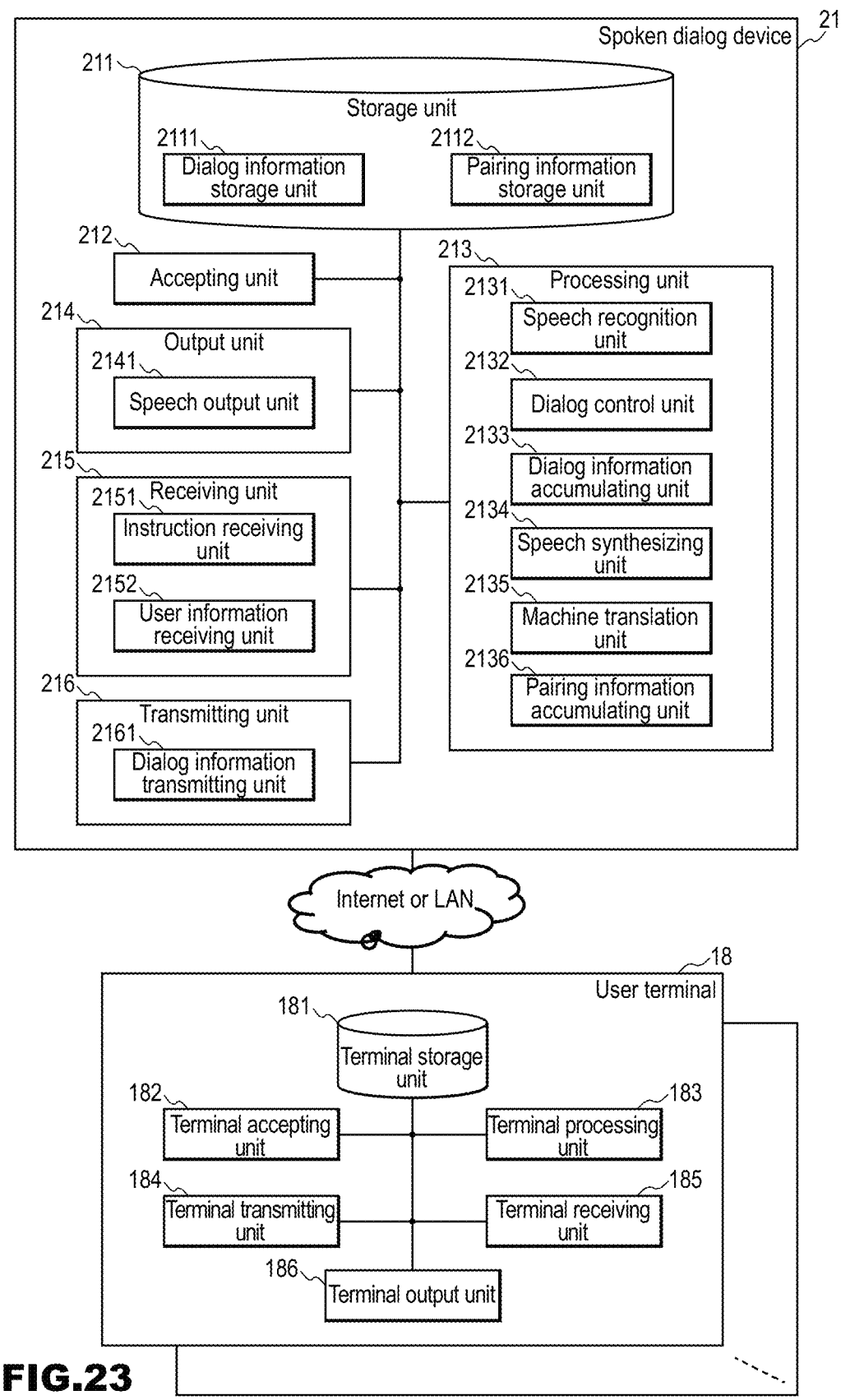
FIG. 23 is a block diagram of a spoken dialog system 2 in Embodiment 2.

FIG. 23 is a block diagram of a spoken dialog system 2 in this embodiment. The spoken dialog system 2 includes a spoken dialog device 21 and one or at least two user terminals 18. The user terminals 18 in this example are the same as those in Embodiment 1, except that they transmit and receive various types of information with the spoken dialog device 21, and thus a description thereof has been omitted.

The spoken dialog device 21 includes a storage unit 211, an accepting unit 212, a processing unit 213, an output unit 214, a receiving unit 215, and a transmitting unit 216.

The storage unit 211 includes a dialog information storage unit 2111, and a pairing information storage unit 2112.

The processing unit 213 includes a speech recognition unit 2131, a dialog control unit 2132, a dialog information accumulating unit 2133, a speech synthesizing unit 2134, a machine translation unit 2135, and a pairing information accumulating unit 2136.

The output unit 214 includes a speech output unit 2141.

The receiving unit 215 includes an instruction receiving unit 2151 and a user information receiving unit 2152.

The transmitting unit 216 includes a dialog information transmitting unit 2161.

In the storage unit 211 constituting the spoken dialog device 21, various types of information are stored.

In the dialog information storage unit 2111 constituting the storage unit 211, dialog information, which is a history of a series of dialog, is stored. The dialog information typically has an input speech text, one or more input speech translation results, a response text, and one or more response translation results.

In the pairing information storage unit 2112, one or at least two pieces of pairing information, which is information indicating pairing with the user terminals 18, are stored.

The accepting unit 212 accepts an input speech that can be input in two or more different languages.

The processing unit 213 performs various types of processing. The various types of processing are later-described pairing processing, or processing that is performed by the speech recognition unit 2131 or the like.

The speech recognition unit 2131 performs speech recognition on the input speech, thereby generating an input speech text that is a speech recognition result. Note that the speech recognition unit 2131 typically acquires a language identifier for identifying a language of the input speech as well.

The dialog control unit 2132 generates a response text that is a response to an input speech text, using the input speech text generated by the speech recognition unit 2131.

If the user information receiving unit 2152 receives an input speech or an input speech text (both of which are contained in user information), the dialog control unit 2132 generates a response text that is a response to an input speech text, from an input speech text corresponding to the input speech received by the user information receiving unit 2152, or the input speech text received by the user information receiving unit 2152.

The dialog control unit 2132 generates a response text that is a response to an input speech text, from an input speech text corresponding to the input speech received by the user information receiving unit 2152, or the input speech text received by the user information receiving unit 2152, using information of a dialog in the dialog information, the information of a dialog being up to a point corresponding to the point information.

The dialog information accumulating unit 2133 accumulates dialog information, which is a dialog history, in the dialog information storage unit 2111. The dialog information accumulating unit 2133 accumulates dialog information containing an input speech text and a response text, in the dialog information storage unit 2111. The dialog information accumulating unit 2133 accumulates dialog information containing an input speech text, one or more input speech translation results, a response text, and one or more response translation results, in the dialog information storage unit 2111.

The speech synthesizing unit 2134 performs speech synthesizing processing on the response text generated by the dialog control unit 2132, thereby acquiring an audio speech.

The machine translation unit 2135 translates an input speech text into one or more languages other than a language of the input speech text, thereby acquiring one or more input speech translation results. Furthermore, the machine translation unit 2135 translates a response text into one or more languages other than a language of the response text, thereby acquiring one or more response translation results.

The two or more languages including the language of the input speech text are determined in advance. For example, in the case in which information indicating that texts in languages of four countries, consisting of Japanese, English, Chinese, and Korean, are necessary is stored in the storage unit 211 (in the case in which language identifiers of the four languages are stored in the storage unit 211), if an accepted text is in Japanese, the machine translation unit 2135 translates the text into languages of three countries, consisting of English, Chinese, and Korean, thereby acquiring translation results. For example, in the case in which information indicating that texts in languages of four countries, consisting of Japanese, English, Chinese, and Korean, are necessary is stored in the storage unit 211, if an accepted text is in English, the machine translation unit 2135 translates the text into languages of three countries, consisting of Japanese, Chinese, and Korean, thereby acquiring translation results.

If the instruction receiving unit 2151 receives a pairing instruction, the pairing information accumulating unit 2136 accumulates pairing information corresponding to the instruction, in the pairing information storage unit 2112.

The output unit 214 outputs various types of information. The output in this example is typically outputting voice, but may also be display on a display screen, transmission to a display device, or the like. The display on a display screen is, for example, the above-described live broadcast display.

The speech output unit 2141 outputs an audio speech.

The receiving unit 215 receives various types of information, instructions, and the like. The various types of information, instructions, and the like are, for example, a pairing instruction, later-described user information, or the like.

The instruction receiving unit 2151 receives a pairing instruction from a user terminal 18. The pairing instruction contains, for example, a terminal identifier, a URL of an area in which dialog information is stored, or the like.

The user information receiving unit 2152 receives user information from the user terminal 18. The user information is, for example, an input speech or an input speech text. The user information may contain, for example, point information indicating one point in dialog information. Note that, if the user information is an input speech text, the user terminal 18 performs speech recognition on the input speech, thereby acquiring an input speech text.

The transmitting unit 216 transmits various types of information.

If the instruction receiving unit 2151 receives an instruction from the user terminal 18, the dialog information transmitting unit 2161 transmits dialog information stored in the dialog information storage unit 2111, to the user terminal 18.

The dialog information transmitting unit 2161 transmits dialog information, or information in the dialog information, the information being in a language corresponding to the user terminal 18, to the user terminal 18.

The dialog information transmitting unit 2161 transmits an input speech text to the user terminal 18 each time the accepting unit 212 accepts an input speech, and transmits a response text to the user terminal 18 each time the dialog control unit 2132 generates a response text.

The dialog information transmitting unit 2161 transmits an input speech text to the user terminal 18 each time the accepting unit 212 accepts an input speech, and transmits a response text each time the dialog control unit 2132 generates a response text, to one or more the user terminals 18 corresponding to one or more pieces of pairing information stored in the pairing information storage unit 2112.

The dialog information transmitting unit 2161 transmits the response text generated by the dialog control unit 2132, to the user terminal 18.

The storage unit 211, the dialog information storage unit 2111, and the pairing information storage unit 2112 are preferably non-volatile storage media, but may be realized also by volatile storage media.

There is no limitation on the procedure in which information is stored in the storage unit 211 and the like. For example, information may be stored in the storage unit 211 and the like via a storage medium, information transmitted via a communication line or the like may be stored in the storage unit 211 and the like, or information input via an input device may be stored in the storage unit 211 and the like.

The processing unit 213, the speech recognition unit 2131, the dialog control unit 2132, the dialog information accumulating unit 2133, the speech synthesizing unit 2134, the machine translation unit 2135, and the pairing information accumulating unit 2136 may be realized typically by MPUs, memories, or the like. Typically, the processing procedure of the processing unit 213 and the like is realized by software, and the software is stored in a storage medium such as a ROM. Note that the processing procedure may also be realized by hardware (dedicated circuits).

The output unit 214 is constituted by an output device such as a display screen or a speaker device, and driver software for the output device.

The receiving unit 215, the instruction receiving unit 2151, and the user information receiving unit 2152 are realized typically by wireless or wired communication parts, but may also be realized by broadcast receiving parts.

The transmitting unit 216 and the dialog information transmitting unit 2161 are realized typically by wireless or wired communication parts, but may also be realized by broadcasting parts.

Next, an operation of the spoken dialog device 21 will be described with reference to the flowchart in FIG. 24.

(Step S2401) The accepting unit 212 determines whether or not it has accepted an input speech. If it has accepted an input speech, the procedure advances to step S2402, and, if not, the procedure advances to step S2409.

(Step S2402) The speech recognition unit 2131 performs speech recognition on the input speech accepted in step S240, thereby generating an input speech text.

(Step S2403) The dialog control unit 2132 generates a response text to the input speech text generated in step S2402, from the input speech text.

(Step S2404) The speech synthesizing unit 2134 performs speech synthesizing processing on the response text generated in step S2403, thereby acquiring an audio speech.

(Step S2405) The machine translation unit 2135 translates the input speech text generated in step S2402 into one or more languages other than a language of the input speech text, thereby acquiring one or more input speech translation results. Furthermore, the machine translation unit 2135 translates the response text generated in step S2403 into one or more languages other than a language of the response text, thereby acquiring one or more response translation results.

(Step S2406) The processing unit 213 accumulates the input speech text generated in step S2402, the response text generated in step S2403, and the translation results acquired in step S2405 in association with each other, in the dialog information storage unit 2111.

(Step S2407) The output unit 214 displays the input speech text generated in step S2402, the response text generated in step S2403, and the translation results acquired in step S2405.

(Step S2408) The speech output unit 2141 outputs the audio speech acquired in step S2404, and the procedure returns to step S2401.

(Step S2409) The instruction receiving unit 2151 determines whether or not it has received a pairing instruction from any user terminal 18. If it has received a pairing instruction, the procedure advances to step S2410, and, if not, the procedure advances to step S2413.

(Step S2410) The processing unit 213 performs processing for pairing the user terminal 18 and the spoken dialog device 21. This processing is the processing described in Embodiment 1 in which the pairing information accumulating unit 2136 accumulates the pairing information in the pairing information storage unit 2112.

(Step S2411) The processing unit 213 acquires dialog information from the dialog information storage unit 2111.

(Step S2412) The dialog information transmitting unit 2161 transmits the dialog information acquired in step S2410, to the user terminal 18 that transmitted the pairing instruction, and the procedure returns to step S2401.

(Step S2413) The user information receiving unit 2152 determines whether or not it has received information from any user terminal 18. If it has received information, the procedure advances to step S2414, and, if not, the procedure returns to step S2401.

(Step S2414) The processing unit 213 acquires an input speech and point information, from the information received in step S2413.

(Step S2415) The speech recognition unit 2131 performs speech recognition on the input speech acquired in step S2414, thereby generating an input speech text. At this time, the speech recognition unit 2131 typically acquires a language identifier as well.

(Step S2416) The dialog control unit 2132 generates a response text that is a response to the input speech text, using the input speech text generated in step S2415.

(Step S2417) The transmitting unit 216 transmits the response text and the like, to the user terminal 18 that transmitted the information. Note that the response text and the like are, for example, an input speech text and a response text, or a response text.

(Step S2418) The processing unit 213 accumulates the input speech text and the response text in association with a terminal identifier, and the procedure returns to step S2401.

Figure 24:
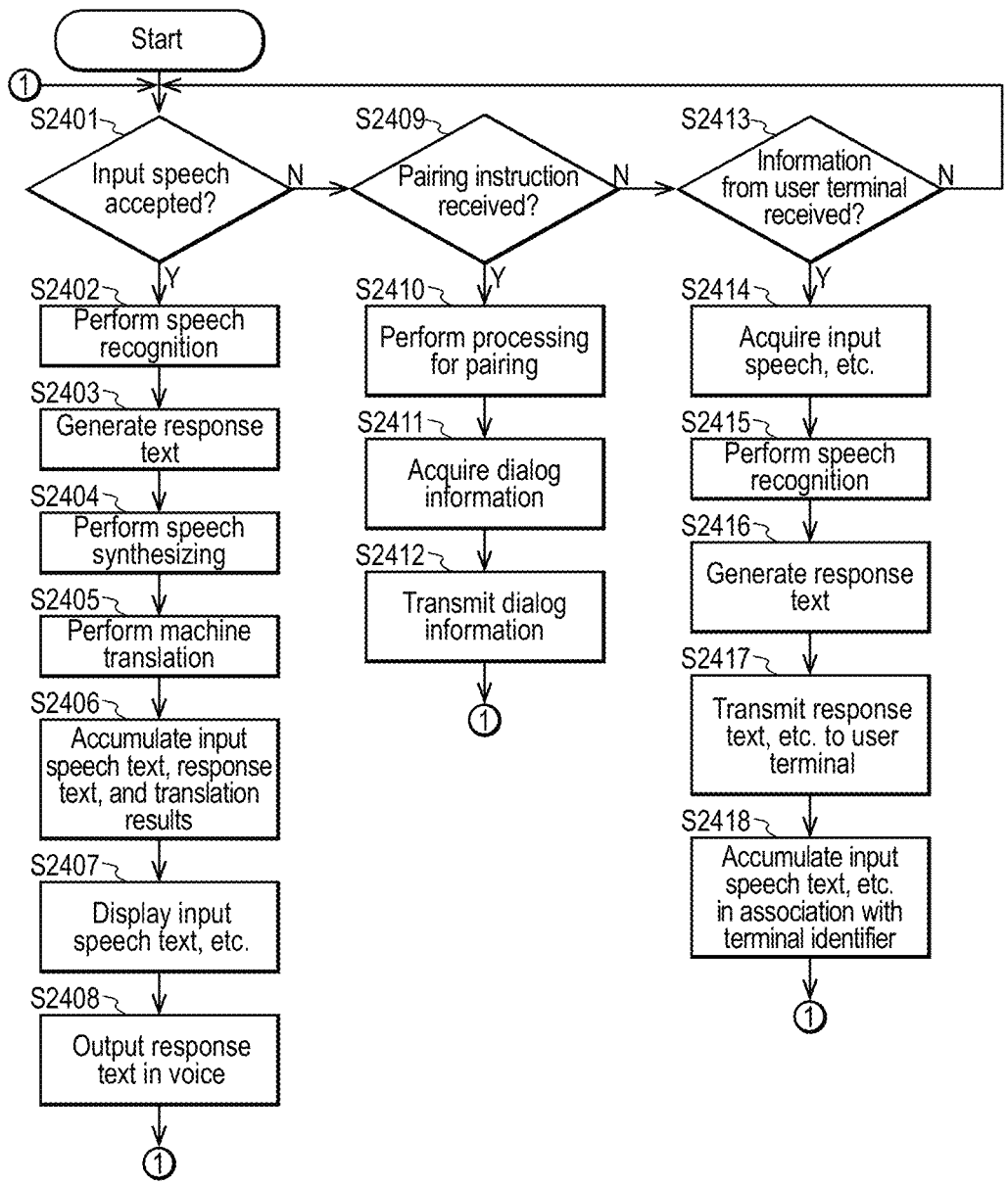
FIG. 24 is a flowchart illustrating an operation of a spoken dialog device 21 in the embodiment.

Note that the procedure is terminated by powering off or an interruption at the end of the process in the flowchart in FIG. 24.

A specific operation of the spoken dialog system 2 in this embodiment is similar to a specific operation of the spoken dialog system 1, and thus a description thereof has been omitted.

As described above, in the cross-lingual spoken dialog according to this embodiment, even after a series of dialog between a user and the spoken dialog device 21 has progressed to some extent, that user or another user can see or recognize a previous dialog status.

Furthermore, according to this embodiment, the spoken dialog device 21 and a user terminal can be synchronized with each other.

Furthermore, according to this embodiment, if a user inputs a speech to the user terminal, synchronization is canceled, and branching of a dialog history can be caused to occur. That is to say, for example, second and subsequent users can continue a dialog independently of a first user from any point during the dialog, by inputting a speech to their own user terminals.

Moreover, according to this embodiment, branching of a dialog can be performed back to previous communication in the dialog.

Figure 25:
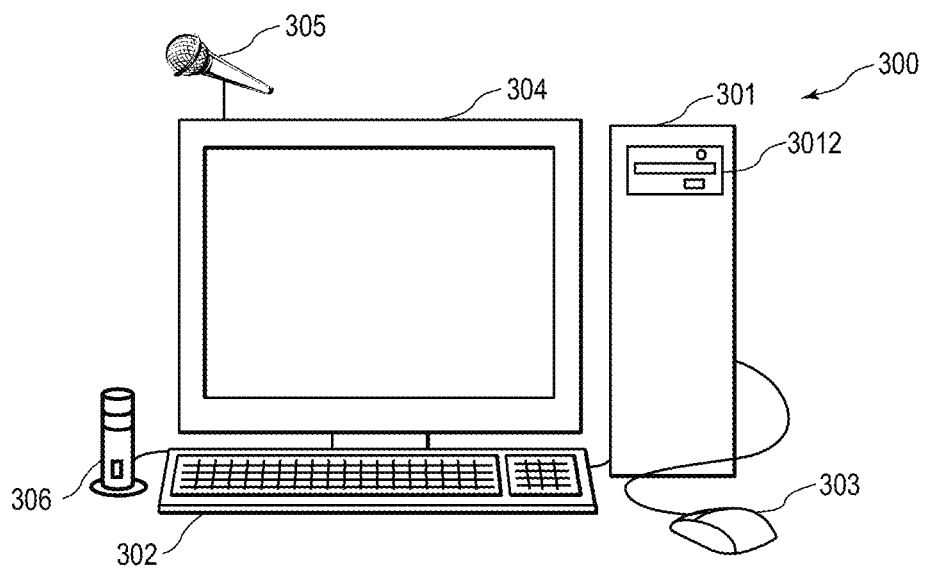
FIG. 25 is a schematic view of a computer system in Embodiments 1 and 2.
Figure 26:
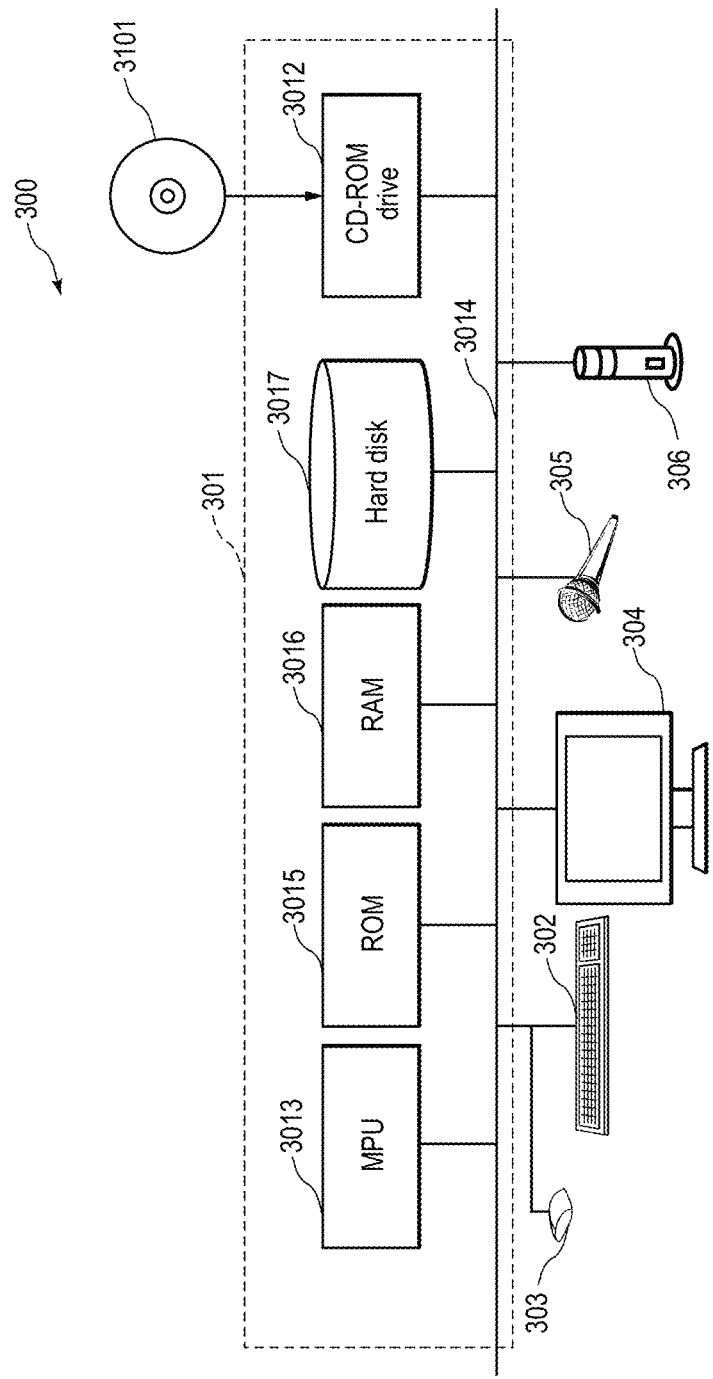
FIG. 26 is a block diagram showing the internal configuration of computer system in the embodiments.
Figure 27:
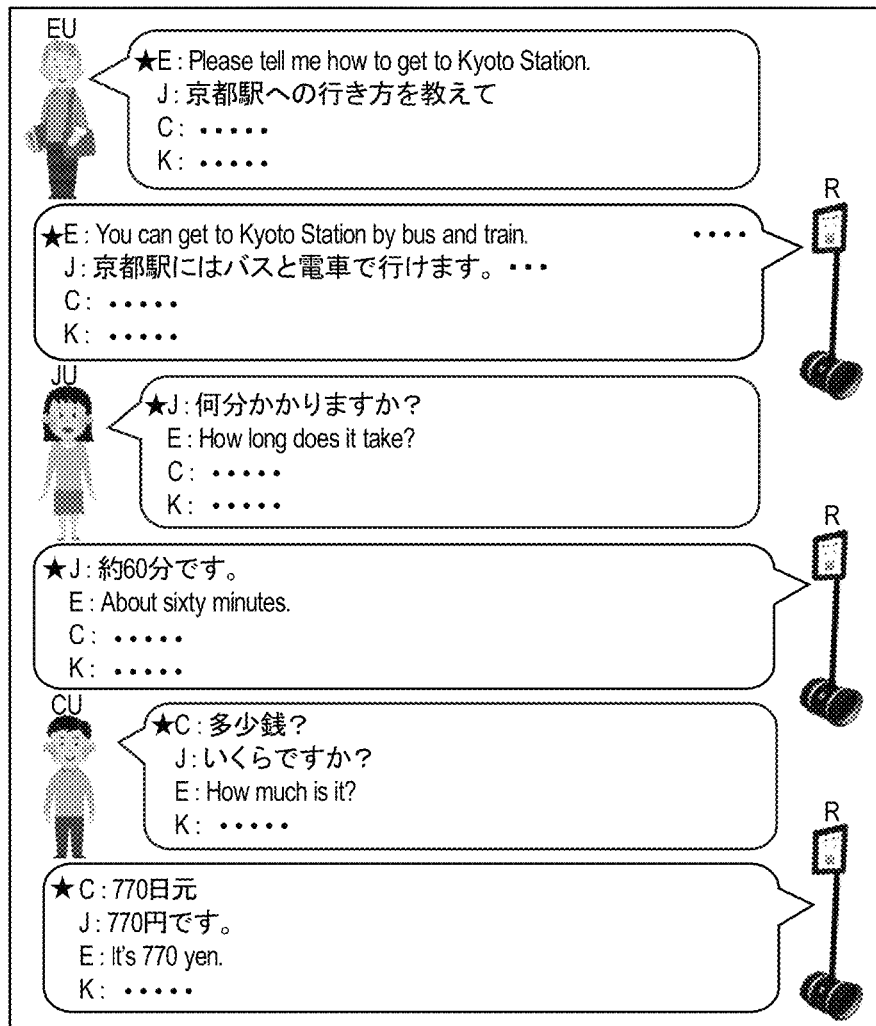
FIG. 27 is a diagram showing an example of live broadcast display in conventional techniques.

FIG. 25 shows the external appearance of a computer that executes the programs described in this specification to realize the devices constituting the spoken dialog system 1, the spoken dialog device 21, and the like in the foregoing various embodiments. The foregoing embodiments may be realized using computer hardware and a computer program executed thereon. FIG. 25 is a schematic view of a computer system 300. FIG. 26 is a block diagram showing the internal configuration of the system 300.

In FIG. 25, the computer system 300 includes a computer 301 including a CD-ROM drive 3012, a keyboard 302, a mouse 303, a monitor 304, a microphone 305, and a speaker 306.

In FIG. 26, the computer 301 includes, in addition to the CD-ROM drive 3012, an MPU 3013, a bus 3014 connected to the CD-ROM drive 3012 and the like, a ROM 3015 in which a program such as a boot up program is stored, a RAM 3016 that is connected to the MPU 3013 and is a memory in which a command of an application program is temporarily stored and a temporary storage area is provided, and a hard disk 3017 in which an application program, a system program, and data are stored. Although not shown, the computer 301 may further include a network card that provides connection to a LAN.

The programs for causing the computer system 300 to execute the functions of the spoken dialog device 21 and the like in the foregoing embodiments may be stored in a CD-ROM 3101 that is inserted into the CD-ROM drive 3012, and be transmitted to the hard disk 3017. Alternatively, the programs may be transmitted via a network (not shown) to the computer 301 and stored in the hard disk 3017. At the time of execution, the programs are loaded into the RAM 3016. The programs may be loaded from the CD-ROM 3101, or directly from a network.

The programs do not necessarily have to include, for example, an operating system (OS) or a third party program to cause the computer 301 to execute the functions of the spoken dialog device 21 and the like in the foregoing embodiments. The programs may only include a command portion to call an appropriate function (module) in a controlled mode and obtain desired results. The manner in which the computer system 300 operates is well known, and thus a detailed description thereof has been omitted.

It should be noted that, in the programs, in a step of transmitting information, a step of receiving information, or the like, processing that is performed by hardware, for example, processing performed by a modem or an interface card in the transmitting step (processing that can be performed only by hardware) is not included.

Furthermore, the computer that executes the programs may be a single computer, or may be multiple computers. That is to say, centralized processing may be performed, or distributed processing may be performed.

Furthermore, in the foregoing embodiments, it will be appreciated that two or more communication parts in one apparatus may be physically realized by one medium.

In the foregoing embodiments, each process may be realized as centralized processing using a single apparatus, or may be realized as distributed processing using multiple apparatuses.

The present invention is not limited to the embodiment set forth herein. Various modifications are possible within the scope of the present invention.

INDUSTRIAL APPLICATION

As described above, the spoken dialog system according to the present invention has an effect that, even after a series of dialog between a user and a device has progressed to some extent, that user or another user can see or recognize a previous dialog status, and thus this system is useful as a spoken dialog system and the like.

LIST OF REFERENCE NUMERALS

1, 2 Spoken dialog system
11 Speech recognition server
12 Dialog control server
13 Speech synthesizing server
14 Machine translation server
15 Pairing server
16 Dialog client
17 Robot
18 User terminal
21 Spoken dialog device
111, 161 Speech accepting unit
112 Language identifying unit
113 Speech recognition engine
114 Input speech text sending unit
121 Input speech text accepting unit
122 Dialog control module
123 Response text sending unit
131 Response text accepting unit
132 Speech synthesizing engine
133 Speech sending unit
141 Text accepting unit
142 Machine translation engine
143 Translation result sending unit
151, 2112 Pairing information storage unit
152, 2151 Instruction receiving unit
153, 2136 Pairing information accumulating unit
154 Pairing-related information sending unit
162, 2141 Speech output unit
163 Microphone & AD converter
164 Voice section detecting part
165 Speaker device
166 Display screen
167 Dialog history
181 Terminal storage unit
182 Terminal accepting unit
183 Terminal processing unit
184 Terminal transmitting unit 185 Terminal receiving unit
186 Terminal output unit
211 Storage unit
212 Accepting unit
213 Processing unit
214 Output unit
215 Receiving unit
216 Transmitting unit
1221 Dialog scenario storage unit
1222 Database
1223 Dialog history storage unit
1224 Language understanding unit
1225 Scenario control unit
1226 Response generating unit
1301 Virtual agent
2111 Dialog information storage unit
2131 Speech recognition unit
2132 Dialog control unit
2133 Dialog information accumulating unit
2134 Speech synthesizing unit
2135 Machine translation unit
2152 User information receiving unit
2161 Dialog information transmitting unit

The invention claimed is:

1. A cross-lingual spoken dialog system, comprising:
a storage medium; and
a processor and a memory storing a program, wherein the program, wherein:
dialog information, which is information of a series of dialog, is being accumulated in the storage medium, the dialog information having:
an input speech text that is a speech recognition result of an input speech input by a user,
one or more input speech translation results that are generated from the input speech text,
a response text that is a response from the system to the input speech text, and
a response translation result that is generated from the response text, and
during a progress of a dialog in the cross-lingual spoken dialog system, the program when executed by the processor, causes the processor to operate such that, in a case in which a pairing instruction is received from a user terminal of a new user who has not participated in the dialog, pairing processing with the user terminal is performed, and the dialog information accumulated in the storage medium is transmitted to the user terminal.

2. A spoken dialog device comprising:
a dialog information storage medium; and
a processor and a memory storing a program, wherein the program, when executed by the processor, causes the processor to perform:
accepting an input speech that is input by a user and can be input in two or more different languages;
performing speech recognition on the input speech, thereby generating an input speech text that is a speech recognition result;
generating a response text that is a response to the input speech text, using the input speech text;
generating one or more input speech translation results from the input speech text, and generating one or more response translation results from the response text;
acquiring an audio speech according to the response text;
outputting the audio speech;
accumulating, in the dialog information storage medium, dialog information, which is information of a series of dialog, the dialog information comprising the input speech text and the response text;
receiving a pairing instruction from a user terminal of a new user who has not participated in the series of dialog; and
transmitting, in a case in which the pairing instruction from the user terminal is received, the dialog information accumulated in the dialog information storage medium, which is the information of the series of dialog, to the user terminal.

3. The spoken dialog device according to claim 2, wherein in the accepting, an input speech from the user terminal is accepted as well, and
the program, when executed by the processor, further causes the computer to perform, in a case in which an input speech from the user terminal is accepted, generating a response text that is a response to an input speech text corresponding to the input speech from the user terminal, from the input speech text, and transmitting the response text to the user terminal.

4. The spoken dialog device according to claim 3, wherein the program, when executed by the processor, causes the computer to perform accepting point information indicating one point in the dialog information of the series of dialog, and generating a response text that is a response to the input speech text corresponding to the input speech from the user terminal, from the input speech text, using information of a dialog in the dialog information, the information being information of a dialog up to a point corresponding to the point information.

5. A spoken dialog method using a storage medium in which dialog information, which is information of a series of dialog, is accumulated, the dialog information having an input speech text that is a speech recognition result of an input speech input by a user, one or more input speech translation results that are generated from the input speech text, a response text that is a response from a system to the input speech text, and a response translation result that is generated from the response text, the method comprising:
a step of receiving a pairing instruction from a user terminal of a new user who has not participated in the series of dialog, during a progress of the series of dialog in a cross-lingual spoken dialog system;
a step of performing pairing processing with the user terminal in a case of receiving the pairing instruction; and
a step of transmitting the dialog information accumulated in the storage medium, which is the information of the series of dialog, to the user terminal.

* * * * *